US011869690B2

(12) United States Patent
Sakuma et al.

(10) Patent No.: US 11,869,690 B2
(45) Date of Patent: Jan. 9, 2024

(54) RARE EARTH MAGNET AND PRODUCING METHOD THEREOF

(71) Applicant: TOYOTA JIDOSHA KABUSHIKI KAISHA, Toyota (JP)

(72) Inventors: Noritsugu Sakuma, Mishima (JP); Tetsuya Shoji, Susono (JP); Akihito Kinoshita, Mishima (JP); Akira Kato, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/578,856

(22) Filed: Jan. 19, 2022

(65) Prior Publication Data

US 2022/0301753 A1 Sep. 22, 2022

(30) Foreign Application Priority Data

Mar. 16, 2021 (JP) ................................ 2021-042183

(51) Int. Cl.
*H01F 1/057* (2006.01)
*H01F 41/02* (2006.01)
(Continued)

(52) U.S. Cl.
CPC ......... *H01F 1/0577* (2013.01); *C22C 38/005* (2013.01); *C22C 38/10* (2013.01);
(Continued)

(58) Field of Classification Search
None
See application file for complete search history.

(56) References Cited

U.S. PATENT DOCUMENTS

2015/0132178 A1 5/2015 Suzuki et al.
2021/0065973 A1* 3/2021 Yokota .................. C22C 38/002
2021/0327620 A1 10/2021 Sakuma et al.

FOREIGN PATENT DOCUMENTS

JP 2021-174818 A 11/2021
WO 2014/148145 A1 9/2014
WO 2019/223431 A1 11/2019

OTHER PUBLICATIONS

Kotaro Saito et al. “Quantitative Evaluation of Site Preference In Dy-Substituted Nd2Fe14B”. Journal of Alloys and Compounds, vol. 721, No. 15, 2017, pp. 476-481.

(Continued)

*Primary Examiner* — Xiaowei Su
(74) *Attorney, Agent, or Firm* — Oliff PLC

(57) ABSTRACT

A rare earth magnet in which the amount used of a heavy rare earth element is more reduced while maintaining enhancement of the coercive force, and a producing method thereof are provided. The rare earth magnet of the present disclosure has a main phase 10 and a grain boundary phase 20. The main phase 10 has a composition represented by $R^1_2T_{14}B$. The main phase 10 has a core part 12 and a shell part 14. Denoting the abundances of $R^2$ and Ce ($R^2$ is heavy rare earth element) occupying 4f site of the shell part 14 as $R^2_{4f}$ and $Ce_{4f}$, respectively, and denoting the abundances of $R^2$ and Ce occupying 4g site of the shell part 14 as $R^2_{4g}$ and $Ce_{4g}$, respectively, the rare earth magnet satisfies $0.44 \leq R^2_{4g}/(R^2_{4f}+R^2_{4g}) \leq 0.70$ and $0.04 \leq (Ce_{4f}+Ce_{4g})/(R^2_{4f}+R^2_{4g})$. The rare earth magnet-producing method of the present disclosure uses a modifier containing at least $R^2$ and Ce.

8 Claims, 10 Drawing Sheets

(51) Int. Cl.
*B22F 3/24* (2006.01)
*C22C 38/00* (2006.01)
*C22C 38/10* (2006.01)

(52) U.S. Cl.
CPC ..... *H01F 41/0293* (2013.01); *C22C 2202/02* (2013.01); *H01F 41/0266* (2013.01)

(56) References Cited

OTHER PUBLICATIONS

Y. J. Wong et al., "Comparison on the coercivity enhancement of sintered NdFeB magnets by grain boundary diffusion with low-melting (Tb, R)75CU25 alloys (R=None, Y, La, and Ce)". AIP advances, vol. 9, (2019), pp. 125238-1-125238-4.

* cited by examiner

RARE EARTH MAGNET AND PRODUCING METHOD THEREOF

FIELD

The present disclosure relates to a rare earth magnet and a producing method thereof. More specifically, the present disclosure relates to an $R^1$-T-B-based rare earth magnet and a producing method thereof. Here, $R^1$ is one or more elements selected from the group consisting of Y and rare earth elements, and T is one or more transition elements mandatorily containing one or more elements selected from the group consisting of Fe, Co and Ni.

BACKGROUND

The $R^1$-T-B-based rare earth magnet has a main phase having a composition represented by $R^1_2T_{14}B$. Due to this main phase, the $R^1$-T-B-based rare earth magnet develops magnetism.

A representative $R^1$-T-B-based rare earth magnet is a Nd-T-B-based rare earth magnet fabricated by selecting Nd as $R^1$. However, in recent years, attempts to select a plurality of types of rare earth elements as $R^1$ according to the required functions (properties) are being made. In addition, at the time of selecting a plurality of types of rare earth elements as $R^1$, it is being attempted to change the arrangement of rare earth elements in the main phase for each type of the rare earth magnet.

For example, Patent Literature 1 discloses an $R^1$-T-B-based rare earth magnet in which denoting the abundances of Ce occupying 4f site and 4g site in the main phase as $Ce_{4f}$ and $Ce_{4g}$, respectively, the rare earth magnet satisfies the relationship of $0.8 \le Ce_{4f}/(Ce_{4f}+Ce_{4g}) \le 1.0$. Moreover, in Patent Literature 1, it is disclosed that even when a rare earth magnet satisfying the relationship above is attached to a rotor of a motor and a centrifugal force acts on the rare earth magnet during rotation of the motor, the rare earth magnet is hardly separated from the rotor and thus has high adhesiveness. Incidentally, as for 4f site and 4g site in the main phase, Non-Patent Literature 1 may be referred to.

In addition, as the method for selecting a plurality of types of rare earth elements as $R^1$ in the $R^1$-T-B-based rare earth magnet, it has been conventionally practiced, for example, to use a Nd-T-B-based rare earth magnet as a precursor and allow a heavy rare earth element to diffuse and penetrate into the precursor. It is known that doing this enhances the coercive force even when the amount of an expensive heavy rare earth element used is relatively small.

CITATION LIST

Patent Literature

[PTL 1] International Publication WO2014/148145

Non-Patent Literature

[Non-PTL 1] K. Saito et al., "Quantitative evaluation of site preference in Dy-substituted $Nd_2Fe_{14}B$", Journal of Alloys and Compounds, Volume 721, 15 Oct. 2017, Pages 476-481

SUMMARY

Technical Problem

When a heavy rare earth element diffuses and penetrates into a rare earth magnet precursor, as described above, the coercive force is enhanced. However, the heavy rare earth element is expensive and moreover, the price of the heavy rare earth element is expected to still more soar. Accordingly, the present inventors have found a problem that it is demanded to more reduce the amount used of the heavy rare earth element while maintaining enhancement of the coercive force.

The present disclosure has been made to solve the problem above. An object of the present disclosure is to provide a rare earth magnet in which the amount used of a heavy rare earth element is more reduced while maintaining enhancement of the coercive force, and a producing method thereof.

Solution to Problem

The present inventors have made many intensive studies to attain the object above and have accomplished the rare earth magnet of the present disclosure and a producing method thereof. The rare earth magnet of the present disclosure and a producing method thereof include the following embodiments.

<1> A rare earth magnet including:

a main phase having a composition represented by, in molar ratio, $R^1_2T_{14}B$ ($R^1$ is one or more elements selected from the group consisting of Y and rare earth elements and T is one or more transition elements mandatorily containing one or more elements selected from the group consisting of Fe, Co and Ni), and a grain boundary phase present around the main phase, wherein:

the main phase has a core part and a shell part present around the core part, the molar ratio of $R^2$ ($R^2$ is one or more elements selected from the groups consisting of Gd, Tb, Dy, Ho, Er, Tm, Yb, and Lu) in the shell part is higher than the molar ratio of $R^2$ in the core part, and the rare earth magnet satisfies the following relationships, denoting the abundances of $R^2$ and Ce occupying 4f site of the shell part as $R^2_{4f}$ and $Ce_{4f}$, respectively, and denoting the abundances of $R^2$ and Ce occupying 4g site of the shell part as $R^2_{4g}$ and $Ce_{4g}$, respectively, $$0.44 \le R^2_{4g}/(R^2_{4f}+R^2_{4g}) \le 0.70, \text{ and}$$

$$0.04 \le (Ce_{4f}+Ce_{4g})/(R^2_{4f}+R^2_{4g}).$$

<2> The rare earth magnet according to item ≤1>, wherein:

$R^1$ is one or more Y and rare earth elements mandatorily containing Ce, Nd and $R^2$, T is one or more transition elements mandatorily containing one or more elements selected from the group consisting of Fe and Co, in the core part, the molar ratio of the total of Y, Sc, La and Ce is less than 0.10 relative to $R^1$ in the entire core part, in the core part, the molar ratio of Co is less than 0.10 relative to T in the entire core part, and the rare earth magnet satisfies the following relationship:

$$0.47 \le R^2_{4g}/(R^2_{4f}+R^2_{4g}) \le 0.54.$$

<3> The rare earth magnet according to item <1>, wherein:

$R^1$ is one or more Y and rare earth elements mandatorily containing Ce, La, Nd and $R^2$, T is one or more transition elements mandatorily containing one or more elements selected from the group consisting of Fe and Co, in the core part, the molar ratio of the total of Y, Sc and Ce is less than 0.10 and the molar ratio of La is from 0.01 to 0.20, relative to $R^1$ in the entire core part, in the core part, the molar ratio of Co is from 0.10 to 0.40 relative to T in the entire core part, and the rare earth magnet satisfies the following relationship:

$$0.50 \leq R^2_{4g}/(R^2_{4f}+R^2_{4g}) \leq 0.60.$$

<4> The rare earth magnet according to item <1>, wherein:

$R^1$ is one or more Y and rare earth elements mandatorily containing Ce, Nd and $R^2$, T is one or more transition elements mandatorily containing one or more elements selected from the group consisting of Fe and Co, in the core part, the molar ratio of the total of Y, Sc, La and Ce is from 0.10 to 0.90 relative to $R^1$ in the entire core part, in the core part, the molar ratio of Co is 0.40 or less relative to T in the entire core part, and the rare earth magnet satisfies the following relationship:

$$0.44 \leq R^2_{4g}/(R^2_{4f}+R^2_{4g}) \leq 0.51.$$

<5> The rare earth magnet according to any one of items <1> to <4>, which has a secondary shell part between the core part and the shell part, wherein the molar ratio of $R^4$ ($R^4$ is one or more elements selected from the group consisting of Pr, Nd, Pm, Sm and Eu) in the secondary shell part is higher than the molar ratio of $R_4$ in the core part.

<6> A method for producing the rare earth magnet according to item <1>, the rare earth magnet-producing method including:

preparing a rare earth magnet precursor including a main phase having a composition represented by, in molar ratio, $R^1_2T_{14}B$ ($R^1$ is one or more elements selected from the group consisting of Y and rare earth elements and T is one or more transition elements mandatorily containing one or more elements selected from the group consisting of Fe, Co and Ni) and a grain boundary phase present around the main phase, and allowing a modifier containing at least $R^2$ and Ce to diffuse and penetrate inside the rare earth magnet precursor.

<7> The rare earth magnet-producing method according to item <6>, wherein:

in the rare earth magnet precursor, $R^1$ is one or more Y and rare earth elements mandatorily containing Nd, T is one or more transition elements mandatorily containing one or more elements selected from the group consisting of Fe and Co, the molar ratio of the total of Y, Sc, La and Ce is less than 0.10 relative to $R^1$, and the molar ratio of Co is less than 0.10 relative to T.

<8> The rare earth magnet-producing method according to item <6>, wherein:

in the rare earth magnet precursor, $R^1$ is one or more Y and rare earth elements mandatorily containing La and Nd, T is one or more transition elements mandatorily containing one or more elements selected from the group consisting of Fe and Co, the molar ratio of the total of Y, Sc and Ce is less than 0.10 and the molar ratio of La is from 0.01 to 0.20, relative to $R^1$, and the molar ratio of Co is from 0.10 to 0.40 relative to T.

<9> The rare earth magnet-producing method according to item <6>, wherein:

in the rare earth magnet precursor, $R^1$ is one or more Y and rare earth elements mandatorily containing Ce and Nd, T is one or more transition elements mandatorily containing one or more elements selected from the group consisting of Fe and Co, the molar ratio of the total of Y, Sc, La and Ce is from 0.10 to 0.90 relative to $R^1$, and the molar ratio of Co is 0.40 or less relative to T.

<10> The rare earth magnet-producing method according to any one of items <6> to <9>, further including, before the modifier diffuses and penetrates inside the rare earth magnet precursor, allowing an auxiliary modifier to diffuse and penetrate inside the rare earth magnet precursor, wherein:

the auxiliary modifier contains at least $R^4$ ($R^4$ is one or more elements selected from the group consisting of Pr, Nd, Pm, Sm and Eu).

Advantageous Effects of Invention

According to the present disclosure, most of Ce occupies 4f site in the main phase, so that many heavy rare earth elements contributing to enhancement of the coercive force can easily occupy, in the main phase, 4g site that contributes to enhancement of the coercive force. Consequently, a higher coercive force than that predicted from the content ratio of heavy rare earth elements in the rare earth elements can be obtained. Such a rare earth magnet can be obtained by allowing a modifier containing both a heavy rare earth element and Ce to diffuse and penetrate into a rare earth magnet precursor. Therefore, according to the present disclosure, a rare earth magnet in which the amount used of a heavy rare earth element is more reduced while maintaining enhancement of the coercive force, and a producing method thereof can be provided.

DESCRIPTION OF EMBODIMENTS

Figure 1:
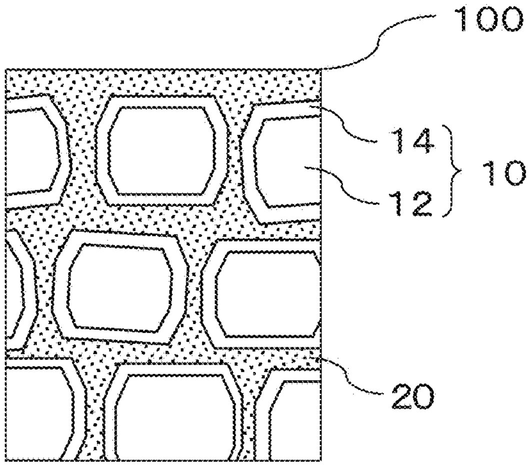
FIG. 1 is an explanatory diagram schematically illustrating one example of the microstructure of the rare earth magnet of the present disclosure.

Embodiments of the rare earth magnet of the present disclosure and the producing method thereof are described below. However, the embodiments described below should not be construed to limit the rare earth magnet of the present disclosure and the producing method thereof.

Although not bound by theory, the reason why the rare earth magnet of the present disclosure has a higher coercive force than that predicted from the content ratio of heavy rare earth elements is described. Also, although not bound by theory, the reason why the rare earth magnet of the present disclosure is obtained by effecting diffusion and penetration of a modifier containing both a heavy rare earth element and Ce is described together by referring to the drawings.

FIG. 1 is an explanatory diagram schematically illustrating one example of the microstructure of the rare earth magnet 100 of the present disclosure. The rare earth magnet 100 of the present disclosure has a main phase 10 and a grain boundary phase 20. The grain boundary phase 20 is present around the main phase 10. In addition, the main phase 10 has a core part 12 and a shell part 14. The shell part 14 is present around the core part 12.

As illustrated in FIG. 1, the main phase 10 of the rare earth magnet 100 of the present disclosure has a core/shell structure. The core/shell structure is obtained by allowing a modifier 60 to diffuse and penetrate into a rare earth magnet precursor 50. This is described by referring to the drawings.

Figure 2A:
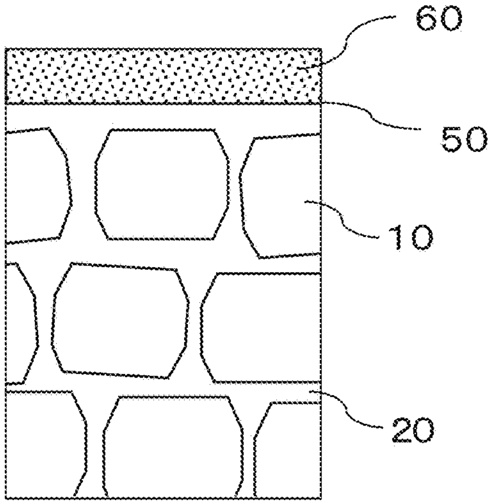
FIG. 2A is an explanatory diagram schematically illustrating one example of the state in which a modifier is put into contact with a rare earth magnet precursor.
Figure 2B:
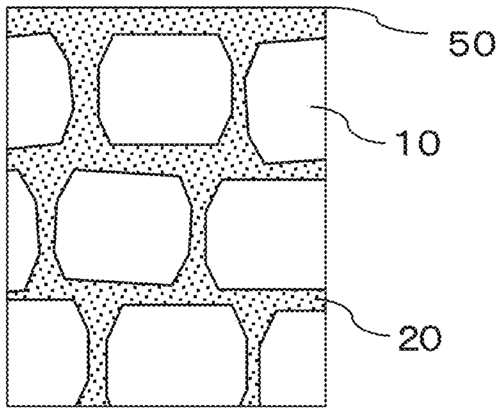
FIG. 2B is an explanatory diagram schematically illustrating one example of the state in which a modifier has diffused and penetrated into the grain boundary phase of a rare earth magnet precursor.
Figure 2C:
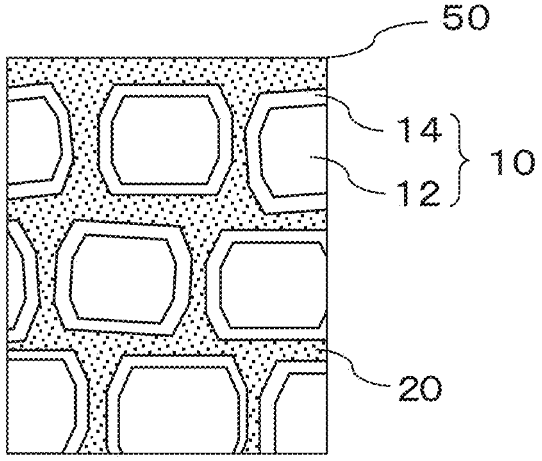
FIG. 2C is an explanatory diagram schematically illustrating one example of the state in which a core/shell structure is formed in the main phase.

FIG. 2A is an explanatory diagram schematically illustrating one example of the state in which a modifier 60 is put into contact with a rare earth magnet precursor 50. FIG. 2B is an explanatory diagram schematically illustrating one example of the state in which a modifier 60 has diffused and penetrated into the grain boundary phase 20 of a rare earth magnet precursor 50. FIG. 2C is an explanatory diagram schematically illustrating one example of the state in which a core/shell structure is formed in the main phase.

As illustrated in FIG. 2A, the main phase 10 is a single phase before the modifier 60 diffuses and penetrates into the rare earth magnet precursor 50. The single phase means a phase having substantially a single crystal structure and a single composition. When the rare earth magnet precursor 50 is heated in the state of being in contact with the modifier 60 as illustrated in FIG. 2A, the modifier 60 diffuses and penetrates into the grain boundary phase 20 as illustrated in FIG. 2B. The modifier 60 having diffused and penetrated into the grain boundary phase 20 further diffuses and penetrates into the outer periphery of the main phase 10 to form a core part 12 and a shell part 14 as illustrated in FIG. 2C. At the time of formation of a core/shell structure in the single-phase main phase 10, part of rare earth elements present in the outer periphery of the single-phase main phase 10 is exchanged with part of rare earth elements of the modifier 60 having diffused and penetrated into the grain boundary phase 20, and a shell part 14 is thereby formed. On the other hand, the core part 12 maintains the same composition as that of the single-phase main phase 10. The thus-formed main phase 10 of the rare earth magnet 100 of the present disclosure has a core/shell structure as illustrated in FIG. 1.

Next, the crystal structure of the main phase 10 is described.

Figure 3:
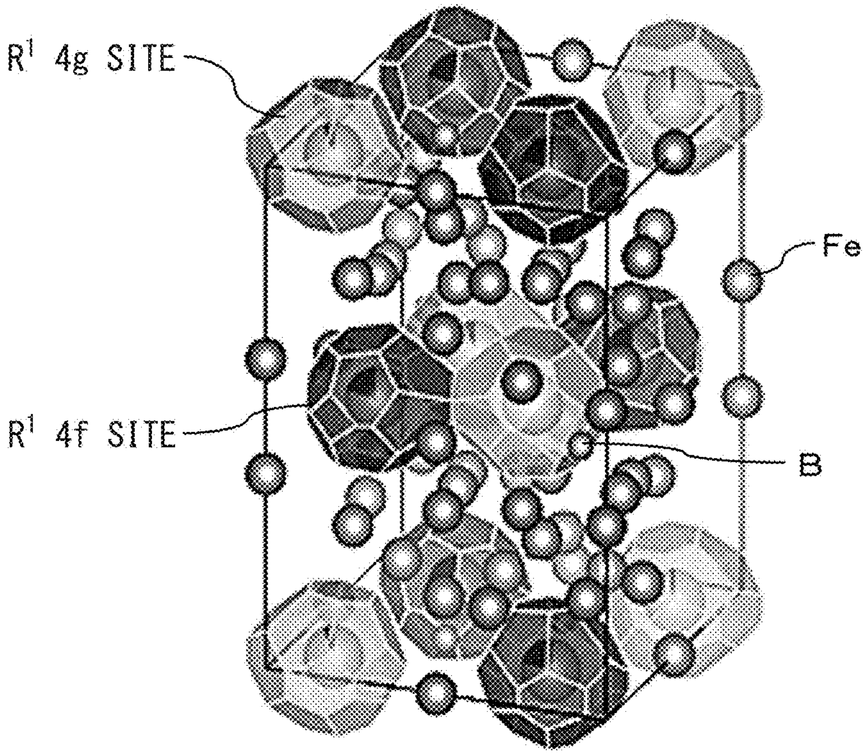
FIG. 3 is an explanatory diagram schematically illustrating a crystal structure of the main phase.
Figure 4:
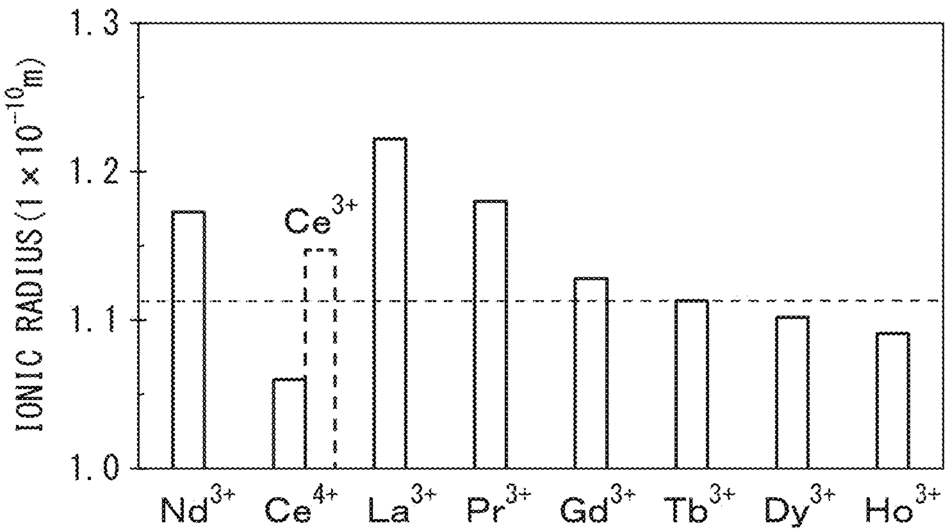
FIG. 4 is a graph illustrating the ionic radius of each rare earth element.

FIG. 3 is an explanatory diagram schematically illustrating a crystal structure of the main phase 10. FIG. 3 is adapted from Non-Patent Literature 1. FIG. 4 is a graph illustrating the ionic radius of each rare earth element.

As illustrated in FIG. 3, in the main phase 10, $R^1$, T and B are present at a ratio of 2:14:1 in terms of atomic ratio in both the core part 12 and the shell part 14, and the crystal has basically a tetragonal structure. $R^1$ occupies 4f site inside the tetragonal crystal and 4g site facing the outside of the tetragonal crystal. Out of $R^1$, an atom having a small ionic radius is likely to occupy 4f site, and an atom having a large ionic radius is likely to occupy 4g site.

The 4f site is basically orthogonal to the magnetic anisotropy of the entire crystal structure of the main phase, and therefore $R^1$ occupying 4f site hardly contributes to enhancement of the anisotropic magnetic field. On the other hand, 4g site is basically parallel to the magnetic anisotropy of the entire crystal structure of the main phase, and therefore $R^1$ occupying 4g site greatly contributes to enhancement of the anisotropic magnetic field. Also, the heavy rare earth element contributes to enhancement of the anisotropic magnetic field, compared with rare earth elements other than heavy rare earth elements. These facts teach that when as many heavy rare earth elements as possible occupy 4g site, they much more contribute to enhancement of the anisotropic magnetic field and in turn, much more contribute to enhancement of the coercive force.

In addition, when the amount of heavy rare earth elements is more in the shell part 14 than in the core part 12, the anisotropic magnetic field of the entire main phase 10 increases and in turn, the coercive force can be enhanced. Because, in the surface (surface of the shell part 14) of the main phase 10, nucleation of magnetization reversal and nuclear growth of adjacent main phase grains can be suppressed. For this reason, it has been conventionally practiced to allow a modifier 60 containing heavy rare earth elements to diffuse and penetrate into a rare earth magnet precursor 50 substantially free of heavy rare earth elements, thereby letting heavy rare earth elements exist only in a shell part 14 that greatly contributes to enhancement of the anisotropic magnetization. On the other hand, in the core part 12 that little contributes to enhancement of the anisotropic magnetization, presence of expensive heavy rare earth elements is avoided.

In the rare earth magnet 100 of the present disclosure, in the core part 12, presence of expensive heavy rare earth elements is avoided as much as possible, and in the shell part 14, not only many heavy rare earth elements are caused to be present but also the position that the heavy rare earth element occupies in the shell part 14 is specified. That is, in the rare earth magnet 100 of the present disclosure, in the shell part 14, many heavy rare earth elements occupy 4g site. In this connection, diffusion and penetration of a modifier 60 containing both a heavy rare earth element and Ce is effected in order for many heavy rare earth elements to occupy 4g site in the shell part 14.

It has been conventionally considered that when the modifier 60 contains a rare earth element other than the heavy rare earth element, the diffusion and penetration amount of the heavy rare earth element into the shell part 14 is relatively decreased to reduce the anisotropic magnetic field and lower the coercive force. In particular, it has been heretofore thought that when the modifier 60 contains a light rare earth element such as Ce, reduction in the anisotropic magnetic field and decrease of the coercive force are significant. However, although not bound by theory, when a modifier 60 containing both a heavy rare earth element and Ce is used, the coercive force is believed to be more enhanced than ever before for the following reasons.

The rare earth element in the main phase 10 is often trivalent. However, Ce in the main phase 10 is known to be tetravalent. Furthermore, as illustrated in FIG. 4, the ionic radius of Ce ion (tetravalent) is small, compared with other rare earth element ions. As described above, out of Y and rare earth elements ($R^1$), an atom having a small ionic radius is likely to occupy 4f site, and an atom having a large ionic radius is likely to occupy 4g site. Also, as described above, when the modifier 60 is allowed to diffuse and penetrate into the rare earth magnet precursor 50, part of rare earth elements present in the outer periphery of the single-phase main phase 10 is exchanged with part of rare earth elements of the modifier 60 diffused and penetrated into the grain boundary phase 20, and a shell part 14 is formed. When the modifier 60 contains both a heavy rare earth element and Ce, at the time of exchange, Ce preferentially occupies 4f site of the shell part 14 and in turn, a heavy rare earth element is likely to occupy 4g site of the shell part 14. Because, as illustrated in FIG. 4, the ionic radius of Ce (tetravalent) is smaller than the ionic radius of the heavy rare earth element. In addition, as described above, 4g site makes a great contribution to enhancement of the anisotropic magnetic field, compared with 4f site, and therefore, when most of heavy rare earth elements occupy 4g site, the coercive force is enhanced.

Ce significantly decreases the anisotropic magnetic field. However, Ce assists the heavy rare earth element contributing to enhancement of the anisotropic magnetic field in occupying 4g site, and Ce itself occupies 4f site having little effect on enhancement of the anisotropic magnetic field. This prevents heavy rare earth elements from occupying 4f site having little effect on enhancement of the anisotropic magnetic field. As a result, a problem that despite use of an expensive heavy rare earth element, corresponding enhancement of the coercive force cannot be achieved can be solved.

The constituent features of the rare earth magnet of the present disclosure and the producing method thereof, which are based on the knowledge discussed hereinabove, are described below.

Rare Earth Magnet

First, the constituent features of the rare earth magnet of the present disclosure are described.

As illustrated in FIG. 1, the rare earth magnet 100 of the present disclosure has a main phase 10 and a grain boundary phase 20. Each of the main phase 10 and the grain boundary phase 20 is described below.

Main Phase

The main phase 10 has a core part 12 and a shell part 14. The shell part 14 is present around the core part 12. The rare earth magnet 100 of the present disclosure develops magnetism due to the main phase 10. The particle diameter of the main phase 10 is not particularly limited. The average particle diameter of the main phase 10 may be 1.0 μm or more, 1.1 μm or more, 1.2 μm or more, 1.3 μm or more, 1.5 μm or more, 2.0 μm or more, 3.0 μm or more, 4.0 μm or more, 5.0 μm or more, 5.9 μm or more, or 6.0 μm or more, and may be 20 μm or less, 15 μm or less, 10 μm or less, 9.0 μm or less, 8.0 μm or less, or 7.0 μm or less. The rare earth magnet 100 of the present disclosure is obtained by effecting diffusion and penetration of a modifier 60 containing both a heavy rare earth element and Ce. Since the modifier contains a heavy rare earth element, the diffusion and penetration temperature is a relatively high temperature. Therefore, when the main phase 10 has the above-described particle diameter, coarsening of the main phase 10 during diffusion and penetration of the modifier is likely to be suppressed. Here, the "average particle diameter" of the main phase is measured as follows. In a scanning electron microscopic image or a transmission electron microscopic image, a given region observed from a direction perpendicular to the magnetization easy axis is defined, and after a plurality of lines extending in a direction perpendicular to the magnetization easy axis are drawn on main phases present in the given region, the diameter (length) of the main phase is calculated from the distance between intersecting points within particles of the main phase (intercept method). In the case where the cross-section of the main phase is nearly circular, the diameter is calculated in terms of a projection-area equivalent-circle diameter. In the case where the cross-section of the main phase is nearly rectangular, the diameter is calculated by rectangle approximation. The value of $D_{50}$ of the thus-obtained diameter (length) distribution (grain size distribution) is the average particle diameter.

The main phase 10 has a composition represented by, in molar ratio, $R^1_2T_{14}B$. $R^1$ is one or more elements selected from the group consisting of Y and rare earth elements. T is one or more transition elements mandatorily containing one or more elements selected from the group consisting of Fe, Co and Ni. Y is yttrium, Fe is iron, Co is cobalt, and Ni is nickel. The "mandatorily containing" means that it is possible to contain an element other than the intended elements as long as the effects of the rare earth magnet of the present disclosure and the producing method thereof are not impaired. More specifically, the "T mandatorily contains one or more elements selected from the group consisting of Fe, Co and Ni" means that T can contain a transition element other than Fe, Co and Ni as long as the effects of the rare earth magnet of the present disclosure and the producing method thereof are not impaired. Typically, out of T, the total of one or more elements selected from the group consisting of Fe, Co and Ni may be 80 at % or more, 90 at % or more, 95 at % or more, 98 at % or more, or 99 at % or more, and may be even 100 at %. The transition element other than Fe, Co and Ni includes, for example, Ga, Al and Cu, etc. These elements are present mainly in the grain boundary phase 20, but part thereof may be present as an interstitial-type or substitution-type element in the main phase 10.

In the present description, unless otherwise indicated, the rare earth elements are 16 elements of Sc, La, Ce, Pr, Nd, Pm, Sm, Eu, Gd, Tb, Dy, Ho, Er, Tm, Yb, and Lu. Among these, unless otherwise indicated, Sc, La, and Ce are light rare earth elements. In addition, unless otherwise indicated, Pr, Nd, Pm, Sm, and Eu are medium rare earth elements. Furthermore, unless otherwise indicated, Gd, Tb, Dy, Ho, Er, Tm, Yb, and Lu are heavy rare earth elements. Incidentally, in general, the rarity of the heavy rare earth element is high, and the rarity of the light rare earth element is low. The rarity of the medium rare earth element is between the heavy rare earth element and the light rare earth element. Note that Sc is scandium, La is lanthanum, Ce is cerium, Pr is praseodymium, Nd is neodymium, Pm is promethium, Sm is samarium, Eu is europium, Gd is gadolinium, Tb is terbium, Dy is dysprosium, Ho is holmium, Er is erbium, Tm is thulium, Yb is ytterbium, and Lu is lutetium.

As illustrated in FIG. 3, in the main phase 10, $R^1$, T and B are present at a ratio of 2:14:1 in terms of atomic ratio in both the core part 12 and the shell part 14, and the crystal has basically a tetragonal structure. Also, $R^1$ occupies 4f site inside the tetragonal crystal and 4g site facing the outside of the tetragonal crystal. The 4f site and 4g site are described in detail later.

As described above, the rare earth magnet 100 of the present disclosure is obtained by allowing a modifier 60 containing both a heavy rare earth element and Ce to diffuse and penetrate into a rare earth magnet precursor 50. By this diffusion and penetration, a core part 12 and a shell part 14 are obtained. Therefore, the core part 12 has the composition as it is of the main phase 10 of the rare earth magnet precursor 50. Also, in the shell part 14, part of rare earth elements present in the outer periphery of the main phase 10 of the rare earth magnet precursor 50 has been exchanged with part of rare earth elements of the modifier 60. This indicates that the molar ratio of the heavy rare earth element in the shell part 14 is higher than the molar ratio of the heavy rare earth element in the core part 12. The heavy rare earth element is represented by $R^2$, and $R^2$ is one or more elements selected from the groups consisting of Gd, Tb, Dy, Ho, Er, Tm, Yb, and Lu. Accordingly, in the rare earth magnet 100 of the present disclosure, the molar ratio of $R^2$ in the shell part 14 is higher than the molar ratio of $R^2$ in the core part 12. From the viewpoint of enhancing the coercive force without reducing the residual magnetization as much as possible, $R^2$ is preferably one or more elements selected from the group consisting of Tb and Dy, more preferably Tb.

The difference between the molar ratio of $R^2$ in the shell part 14 and the molar ratio of $R^2$ in the core part 12 may be, for example, 0.01 or more, 0.05 or more, 0.10 or more, 0.11 or more, 0.12 or more, 0.13 or more, 0.14 or more, or 0.15 or more, and may be 0.50 or less, 0.45 or less, 0.40 or less, 0.38 or less, 0.37 or less, 0.36 or less, 0.34 or less, 0.32 or less, 0.30 or less, 0.29 or less, 0.28 or less, 0.27 or less, 0.26 or less, 0.24 or less, 0.22 or less, or 0.20 or less.

Next, each of the core part 12 and the shell part 14 is described in detail. Incidentally, for the convenience of description, the shell part 14 is first described.

Shell Part

As illustrated in FIG. 3, $R^1$ occupies 4f site inside the tetragonal crystal and 4g site facing the outside of the tetragonal crystal. Out of $R^1$, an atom having a small ionic radius is likely to occupy 4f site, and an atom having a large ionic radius is likely to occupy 4g site. This indicates that, as described above, referring to FIG. 4, with respect to $R^2$ and Ce derived from the modifier 60, Ce having a small ionic radius is likely to occupy 4f site, and $R^2$ having a large ionic radius is likely to occupy 4g site. From this viewpoint, $R^2$ is preferably one or more elements selected from the group consisting of Gd, Tb, Dy and Ho.

The abundances of $R^2$ and Ce occupying 4f site of the shell part 14 can be denoted, based on the molar ratio, as $R^2_{4f}$ and $Ce_{4f}$, respectively. Also, the abundances of $R^2$ and Ce occupying 4g site of the shell part 14 can be denoted, based on the molar ratio, as $R^2_{4g}$ and $Ce_{4g}$, respectively. At this time, the rare earth magnet 100 of the present disclosure satisfies the following relationships (1) and (2):

$$0.44 \leq R^2_{4g}/(R^2_{4f}+R^2_{4g}) \leq 0.70 \quad (1)$$

$$0.04 \leq (Ce_{4g}+Ce_{4g})/(R^2_{4f}+R^2_{4g}) \quad (2)$$

When $R^2_{4g}/(R^2_{4f}+R^2_{4g})$ is 0.44 or more, many of $R^2$ is occupying 4g site in the shell part 14, and the anisotropic magnetic field of the entire main phase 10 is enhanced, as a result, the coercive force is improved. From this viewpoint, $R^2_{4g}/(R^2_{4f}+R^2_{4g})$ may be 0.45 or more, 0.46 or more, 0.47 or more, 0.48 or more, 0.49 or more, or 0.50 or more. When $R^2_{4g}/(R^2_{4f}+R^2_{4g})$ is 0.70 or less, in the shell part 14, in order for many of $R^2$ to occupy 4g, Ce occupying 4f site is not excessively present, as a result, enhancement of the coercivity corresponding to the amount used of $R^2$ can be maintained. From this viewpoint, $R^2_{4g}/(R^2_{4f}+R^2_{4g})$ may be 0.65 or less, 0.64 or less, 0.63 or less, 0.62 or less, 0.61 or less, 0.60 or less, 0.59 or less, 0.58 or less, 0.57 or less, 0.56 or less, 0.55 or less, 0.54 or less, 0.53 or less, 0.52 or less, or 0.51 or less.

Also, in order for $R^2$ to preferentially occupy 4g site in the shell part 14, a given amount of Ce relative to $R^2$ is necessary. Therefore, in the shell part 14, $(Ce_{4f}+Ce_{4g})/(R^2_{4f}+R^2_{4g})$ needs to be 0.04 or more. From this viewpoint, $(Ce_{4f}+Ce_{4g})/(R^2_{4f}+R^2_{4g})$ may be 0.06 or more, 0.11 or more, 0.13 or more, 0.15 or more, 0.20 or more, 0.25 or more, 0.27 or more, or 0.30 or more, and may be 2.50 or less, 2.03 or less, 2.00 or less, 1.70 or less, 1.66 or less, 1.50 or less, 1.47 or less, 1.14 or less, 1.10 or less, 1.00 or less, 0.84 or less, 0.80 or less, 0.55 or less, 0.52 or less, 0.50 or less, 0.45 or less, 0.43 or less, 0.40 or less, or 0.37 or less.

Core Part

As described above, the core part 12 has the composition as it is of the main phase 10 of the rare earth magnet precursor 50. Therefore, the composition of the core part 12 exhibits the property of the rare earth magnet precursor 50.

As long as the molar ratio of $R^2$ is higher in the shell part 14 than in the core part 12 and $R^2_{4g}/(R^2_{4f}+R^2_{4g})$ and $(Ce_{4f}+Ce_{4g})/(R^2_{4f}+R^2_{4g})$ satisfy the relationships (1) and (2), the composition of the core part 12 is not particularly limited. This means that at the time of producing of the rare earth magnet 100 of the present invention, the composition of the rare earth magnet precursor 50 is not particularly limited. The rare earth magnet precursor 50 is described in "<<Producing Method>>". However, the composition of the core part 12 may be specified so as to enhance specific magnetic properties of the rare earth magnet 100 (rare-earth magnet after the modifier 60 has diffused and penetrated) of the present disclosure or so as to increase the amounts used of Y and light rare earth element to reduce the cost while maintaining the magnetic properties. These are described as rare earth magnets according to first to third embodiments.

First Embodiment

The rare earth magnet according to the first embodiment is as follows:

$R^1$ is one or more Y and rare earth elements mandatorily containing Ce, Nd and $R^2$, T is one or more transition elements mandatorily containing one or more elements selected from the group consisting of Fe and Co, in the core part, the molar ratio of the total of Y, Sc, La and Ce is less than 0.1 relative to $R^1$ in the entire core part, in the core part, the molar ratio of Co is less than 0.1 relative to T in the entire core part, and the rare earth magnet satisfies the relationship of $0.47 \leq R^2_{4g}/(R^2_{4f}+R^2_{4g}) \leq 0.54$.

The rare earth magnet according to the first embodiment is obtained using a rare earth magnet precursor mainly containing Nd and having small contents of one or more of Y and light rare earth elements and Co. The rare earth magnet according to the first embodiment has an excellent balance between the residual magnetization and the coercive force.

In the rare earth magnet according to the first embodiment, $R^1$ is one or more Y and rare earth elements mandatorily containing Ce, Nd and $R^2$. The "mandatorily containing" means that it is possible to contain an element other than the intended elements as long as the effects of the rare earth magnet of the present disclosure and the producing method thereof are not impaired. More specifically, the "mandatorily containing Ce, Nd and $R^2$" means that $R^1$ can contain an element other than Ce, Nd and $R^2$ as long as the effects of the rare earth magnet of the present disclosure and the producing method thereof are not impaired. Typically, out of $R^1$, the total of Ce, Nd and $R^2$ may be 80 at % or more, 90 at % or more, 95 at % or more, 98 at % or more, or 99 at % or more, and may be even 100 at %. Nd is mainly derived from the rare earth magnet precursor, and Ce and $R^2$ are mainly derived from the modifier. Part or the whole of Nd may be replaced by Pr.

T is one or more transition elements mandatorily containing one or more elements selected from the group consisting of Fe and Co. The "mandatorily containing" means that it is possible to contain an element other than the intended elements as long as the effects of the rare earth magnet of the present disclosure and the producing method thereof are not impaired. More specifically, the "T mandatorily contains one or more elements selected from the group consisting of Fe and Co" means that T can contain a transition element other than Fe and Co as long as the effects of the rare earth magnet of the present disclosure and the producing method thereof are not impaired. Typically, out of T, the total of one or more elements selected from the group consisting of Fe and Co may be 80 at % or more, 90 at % or more, 95 at % or more, 98 at % or more, or 99 at % or more, and may be even 100 at %. The transition element other than Fe and Co includes, for example, Ga, Al and Cu, etc. These elements are present mainly in the grain boundary phase 20, but part thereof may be present as an interstitial-type or substitution-type element in the main phase 10.

In the rare earth magnet according to the first embodiment, in the core part, the molar ratio of the total of Y, Sc, La and Ce, relative to $R^1$ in the entire core part, may be less than 0.10, 0.05 or less, or 0.03 or less, and may be even 0. Also, in the core part, the molar ratio of Co, relative to T in the entire core part, may be less than 0.10, 0.05 or less, or 0.03 or less, and may be even 0. As described above, in the core part, the amounts of Y, Sc, La, Ce and Co are small, and this is derived from the rare earth magnet precursor. Such a rare earth magnet precursor has an excellent balance between the residual magnetization and the coercive force, and by allowing a modifier to diffuse and penetrate into this precursor, the coercive force can further be enhanced.

Furthermore, the rare earth magnet according to the first embodiment satisfies $0.47 \leq R^2_{4g}/(R^2_{4f}+R^2_{4g}) \leq 0.54$. By satisfying this relationship, enhancement of the coercive force can be especially recognized. From this viewpoint, $R^2_{4g}/(R^2_{4f}+R^2_{4g})$ may be 0.48 or more, or 0.50 or more, and may be 0.53 or less, or 0.52 or less.

Second Embodiment

The rare earth magnet according to the second embodiment is as follows:

$R^1$ is one or more Y and rare earth elements mandatorily containing Ce, La, Nd and $R^2$, T is one or more transition elements mandatorily containing one or more elements selected from the group consisting of Fe and Co, in the core part, the molar ratio of the total of Y, Sc and Ce is less than 0.1 and the molar ratio of La is from 0.01 to 0.20, relative to $R^1$ in the entire core part, in the core part, the molar ratio of Co is from 0.1 to 0.4 relative to T in the entire core part, and the rare earth magnet satisfies the relationship of $0.50 \leq R^2_{4g}/(R^2_{4f}+R^2_{4g}) \leq 0.60$.

The rare earth magnet according to the second embodiment is obtained using a rare earth magnet precursor in which La and Co are present together. In the rare earth magnet according to the second embodiment, the main phase that becomes unstable when containing La is stabilized by letting La and Co be present together, and the reduction of the residual magnetization can be suppressed despite using inexpensive La.

In rare earth magnet according to the second embodiment, $R^1$ is one or more Y and rare earth elements mandatorily containing Ce, La, Nd and $R^2$. The "mandatorily containing" means that it is possible to contain an element other than the intended elements as long as the effects of the rare earth magnet of the present disclosure and the producing method thereof are not impaired. More specifically, the "mandatorily containing Ce, La, Nd and $R^2$" means that $R^1$ can contain an element other than Ce, La, Nd and $R^2$ as long as the effects of the rare earth magnet of the present disclosure and the producing method thereof are not impaired. Typically, out of $R^1$, the total of Ce, La, Nd and $R^2$ may be 80 at % or more, 90 at % or more, 95 at % or more, 98 at % or more, or 99 at % or more, and may be even 100 at %. La and Nd are mainly derived from the rare earth magnet precursor, and Ce and $R^2$ are mainly derived from the modifier. Part or the whole of Nd may be replaced by Pr.

T is one or more transition elements mandatorily containing one or more elements selected from the group consisting of Fe and Co. The "mandatorily containing" means that it is possible to contain an element other than the intended elements as long as the effects of the rare earth magnet of the present disclosure and the producing method thereof are not impaired. More specifically, the "T mandatorily contains one or more elements selected from the group consisting of Fe and Co" means that T can contain a transition element other than Fe and Co as long as the effects of the rare earth magnet of the present disclosure and the producing method thereof are not impaired. Typically, out of T, the total of one or more elements selected from the group consisting of Fe and Co may be 80 at % or more, 90 at % or more, 95 at % or more, 98 at % or more, or 99 at % or more, and may be even 100 at %. The transition element other than Fe and Co includes, for example, Ga, Al and Cu, etc. These elements are present mainly in the grain boundary phase 20, but part thereof may be present as an interstitial-type or substitution-type element in the main phase 10.

In the rare earth magnet according to the second embodiment, in the core part, the molar ratio of the total of Y, Sc and Ce, relative to $R^1$ in the entire core part, may be less than 0.1, 0.05 or less, or 0.03 or less, and may be even 0. Also, in the core part, the molar ratio of La, relative to $R^1$ in the entire core part, may be 0.01 or more, 0.02 or more, 0.03 or more, 0.04 or more, or 0.05 or more, and may be 0.20 or less, 0.15 or less, 0.10 or less, 0.08 or less, or 0.06 or less. Furthermore, in the core part, the molar ratio of Co, relative to T in the entire core part, may be 0.10 or more, 0.15 or more, or 0.20 or more, and may be 0.40 or less, 0.35 or less, 0.30 or less, or 0.25 or less. As described above, La and Co are present together in the core part, and this is derived from the rare earth magnet precursor. Such a rare earth magnet precursor can suppress the reduction of residual magnetization despite using inexpensive La, and by allowing a modifier to diffuse and penetrate into the precursor, the coercive force can be enhanced.

Furthermore, the rare earth magnet according to the second embodiment satisfies $0.50 \leq R^2_{4g}/(R^2_{4f}+R^2_{4g}) \leq 0.60$. By satisfying this relationship, enhancement of the coercive force can be especially recognized. From this viewpoint, $R^2_{4g}/(R^2_{4f}+R^2_{4g})$ may be 0.52 or more, 0.54 or more, or 0.56 or more, and may be 0.59 or less, 0.58 or less, or 0.57 or less.

Third Embodiment

The rare earth magnet according to the third embodiment is as follows:

- $R^1$ is one or more Y and rare earth elements mandatorily containing Ce, Nd and $R^2$,
- T is one or more transition elements mandatorily containing one or more elements selected from the group consisting of Fe and Co,
- in the core part, the molar ratio of the total of Y, Sc, La and Ce is from 0.10 to 0.90 relative to $R^1$ in the entire core part,
- in the core part, the molar ratio of Co is 0.40 or less relative to T in the entire core part, and
- the rare earth magnet satisfies the relationship of $0.44 \leq R^2_{4g}/(R^2_{4f}+R^2_{4g}) \leq 0.51$.

The rare earth magnet according to the third embodiment maintains desired residual magnetization and coercive force while reducing the amount used of Nd by using a rare earth magnet precursor containing a light rare earth element.

In rare earth magnet according to the third embodiment, $R^1$ is one or more Y and rare earth elements mandatorily containing Ce, Nd and $R^2$. The "mandatorily containing" means that it is possible to contain an element other than the intended elements as long as the effects of the rare earth magnet of the present disclosure and the producing method thereof are not impaired. More specifically, the "mandatorily containing Ce, Nd and $R^1$" means that $R^1$ can contain an element other than Ce, Nd and $R^2$ as long as the effects of the rare earth magnet of the present disclosure and the producing method thereof are not impaired. Typically, out of $R^1$, the total of Ce, Nd and $R^2$ may be 80 at % or more, 90 at % or more, 95 at % or more, 98 at % or more, or 99 at % or more, and may be even 100 at %. Nd is mainly derived from the rare earth magnet precursor, and $R^2$ is mainly derived from the modifier. Ce is derived from both the rare earth magnet precursor and the modifier.

T is one or more transition elements mandatorily containing one or more elements selected from the group consisting of Fe and Co. The "mandatorily containing" means that it is possible to contain an element other than the intended elements as long as the effects of the rare earth magnet of the present disclosure and the producing method thereof are not impaired. More specifically, the "T mandatorily contains one or more elements selected from the group consisting of Fe and Co" means that T can contain a transition element other than Fe and Co as long as the effects of the rare earth magnet of the present disclosure and the producing method thereof are not impaired. Typically, out of T, the total of one or more elements selected from the group consisting of Fe and Co may be 80 at % or more, 90 at % or more, 95 at % or more, 98 at % or more, or 99 at % or more, and may be even 100 at %. The transition element other than Fe and Co includes, for example, Ga, Al and Cu, etc. These elements are present mainly in the grain boundary phase 20, but part thereof may be present as an interstitial-type or substitution-type element in the main phase 10.

In the rare earth magnet according to the third embodiment, in the core part, the molar ratio of the total of Y, Sc, La and Ce, relative to $R^1$ in the entire core part, may be 0.10 or more, 0.20 or more, 0.30 or more, 0.40 or more, or 0.50 or more, and may be 0.90 or less, 0.80 or less, 0.70 or less, or 0.60 or less. Also, in the core part, the molar ratio of Co, relative to T in the entire core part, may be 0.40 or less, 0.30 or less, 0.20 or less, or 0.10 or less, and may be even 0. With these molar ratios, when a rare earth magnet precursor in which the amount used of Nd is reduced by actively using a light rare earth element is used and when a modifier is allowed to diffuse and penetrate into the precursor, the coercive force can further be enhanced while maintaining the residual magnetization and the coercive force.

Furthermore, in the rare earth magnet according to the third embodiment, $R^2_{4g}/(R^2_{4f}+R^2_{4g})$ is 0.44 or more, 0.45 or more, 0.46 or more, or 0.47 or more, and $R^2_{4g}/(R^2_{4f}+R^2_{4g})$ is 0.51 or less, 0.50 or less, 0.49 or less, or 0.48 or less, whereby enhancement of the coercive force can be recognized.

Secondary Shell Part

Figure 5:
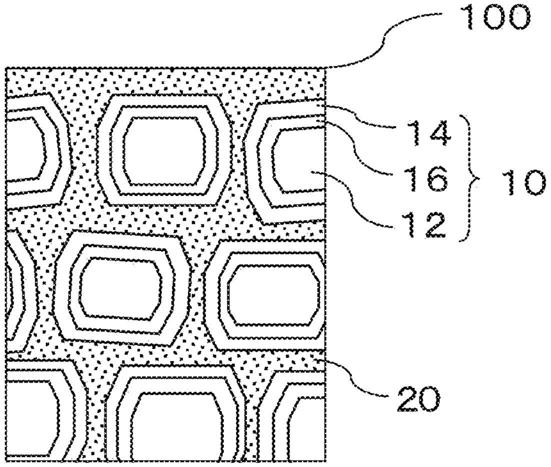
FIG. 5 is an explanatory diagram schematically illustrating one example of the microstructure of the mode in which the rare earth magnet of the present disclosure has a secondary shell part.

The rare earth magnet of the present disclosure may optionally has a secondary shell part. This is described by referring to the drawings. FIG. 5 is an explanatory diagram schematically illustrating one example of the microstructure of the mode in which the rare earth magnet of the present disclosure has a secondary shell part. In this mode, the rare earth magnet 100 of the present disclosure has a secondary shell part 16 between the core part 12 and the shell part 14.

The secondary shell part derives from diffusion and penetration of an auxiliary modifier. The auxiliary modifier contains at least $R^4$. $R^4$ is one or more elements selected from the group consisting of Pr, Nd, Pm, Sm and Eu. That is, $R^4$ is a medium rare earth element. Before the above-described modifier (modifier containing at least both $R^2$ and Ce) diffuses and penetrates inside the rare earth magnet precursor, an auxiliary modifier is allowed to diffuse and penetrate inside the rare earth magnet precursor.

Since the secondary shell is derived from diffusion and penetration of the auxiliary modifier, the molar ratio of $R^4$ in the secondary shell part is higher than the molar ratio of $R^4$ in the core part. The difference between the molar ratio of $R^4$ in the secondary shell part and the molar ratio of $R^4$ in the core part may be, for example, 0.01 or more, 0.05 or more, 0.10 or more, 0.11 or more, 0.12 or more, 0.13 or more, 0.14 or more, or 0.15 or more, and may be 0.50 or less, 0.45 or less, 0.41 or less, 0.40 or less, 0.38 or less, 0.37 or less, 0.36 or less, 0.34 or less, 0.32 or less, 0.30 or less, 0.29 or less, 0.28 or less, 0.27 or less, 0.26 or less, 0.24 or less, 0.22 or less, or 0.20 or less. Because, part of rare earth elements present in the outer periphery of the single-phase main phase is exchanged with part of rare earth elements of the auxiliary modifier diffused and penetrated into the grain boundary phase, and a secondary shell part is thereby formed. The secondary shell part being formed by the diffusion and penetration of the auxiliary modifier is described in detail in "<<Producing Method>>".

Grain Boundary Phase

As illustrated in FIG. 1, the rare earth magnet 100 of the present disclosure has a grain boundary phase 20, in addition to the main phase 10 described hereinbefore. The grain boundary phase 20 is present around the main phase 10.

In the grain boundary phase 20, the modifier 60 has diffused and penetrated. The modifier 60 contains both a heavy rare earth element and Ce and, in general, additionally contains a transition element other than the rare earth element, for example, copper. Consequently, in the grain boundary phase 20, not only the content ratio (concentration) of the rare earth element increases but also the content ratio of the non-magnetic element such as copper increases. Therefore, the grain boundary phase 20 is non-magnetic in many cases. This indicates that the grain boundary phase 20 magnetically separates individual main phases 10 and thereby contributes to enhancement of the coercive force.

Producing Method

The method for producing the rare earth magnet of the present disclosure is described below.

The producing method of the rare earth magnet of the present disclosure includes a rare earth magnet precursor preparation step and a modifier diffusion and penetration step. Also, the producing method of the rare earth magnet of the present disclosure may optionally include an auxiliary modifier diffusion and penetration step. Each step is described below.

Rare Earth Magnet Precursor Preparation Step

A rare earth magnet precursor including a main phase and a grain boundary phase is prepared. The main phase has a composition represented by, in molar ratio, $R^1_2T_{14}B$. $R^1$ and T are as described in "<<Rare Earth Magnet>>".

As illustrated in FIG. 2A, the main phase 10 in the rare earth magnet precursor 50 before diffusion and penetration of the modifier 60 is a single phase. Also, the grain boundary phase 20 is present around the main phase 10.

The composition of the rare earth magnet precursor 50 is not particularly limited as long as a main phase 10 and a grain boundary phase 20 are included in the rare earth magnet precursor 50, but it is preferable to prevent an $\alpha$-Fe phase from being present in the grain boundary 20 as much as possible. For this purpose, the grain boundary phase 20 is preferably a so-called $R^1$-rich phase. The $R^1$-rich phase means a phase in which the content ratio (molar ratio) of $R^1$ in the grain boundary phase 20 is higher than the content ratio (molar ratio) of $R^1$ in the main phase 10. When the grain boundary phase 20 is a so-called $R^1$-rich phase, reduction in the coercivity due to an $\alpha$-Fe phase can be avoided. In addition, if an $\alpha$-Fe phase is present in the grain boundary phase 20, it inhibits diffusion and penetration of the modifier 60, but when the grain boundary phase 20 is a so-called $R^1$-rich phase, inhibition of diffusion and penetration of the modifier 60 can be avoided.

As the rare earth magnet precursor 50, a well-known rare earth magnet including a main phase having a composition represented by $R^1_2T_{14}B$, before the diffusion and penetration of the modifier 60, may also be used. The composition (overall composition) of the rare earth magnet precursor 50 may be, for example, in molar ratio, $R^1_pT_{(100-p-q)}B_q$ (provided that $12.0 \leq p \leq 20.0$ and $5.0 \leq q \leq 20.0$). T may contain unavoidable impurity elements, in addition to the elements described hereinbefore. Most of unavoidable impurity elements are present in the grain boundary phase, but part thereof could be present in the main phase. Incidentally, in the present description, the unavoidable impurity element indicates an impurity element that is inevitably contained or causes a significant rise in the production cost for avoiding its inclusion, such as impurity elements contained in raw materials of the rare earth magnet or impurity elements mixed in during the production process. The impurity element, etc. mixed in during the production process encompass an element incorporated for production convenience to an extent of not affecting the magnetic properties.

In the later-described modifier diffusion and penetration step, the modifier 60 diffuses and penetrates around the outer periphery of the single-phase main phase 10 of the rare earth magnet precursor 50. Consequently, in the rare earth magnet 100 (rare earth magnet after the modifier 60 has diffused and penetrated) of the present disclosure, as illustrated in FIG. 2C, the main phase 10 has a core/shell structure. This indicates that, as described in "<Core Part>" of "<<Rare Earth Magnet>>", the composition of the core part 12 in the main phase 10 of the rare earth magnet 100 (rare earth magnet after the modifier 60 has diffused and penetrated) is the composition as it is of the single-phase main phase 10 in the rare earth magnet precursor 50. Accordingly, with respect to the composition of the main phase 10 of the rare earth magnet precursor 50, the description in "<Core Part>" of "<<Rare Earth Magnet>>" can be referred to. In the following, the rare earth magnet precursor used for the production of rare earth magnets according to the first to third embodiments described in "<Core Part>" of "<<Rare Earth Magnet>>" is roughly described.

Rare Earth Magnet Precursor Used for Production of Rare Earth Magnet According to First Embodiment The rare earth magnet precursor used for the production of the rare earth magnet according to the first embodiment (hereinafter sometimes referred to as "rare earth magnet precursor of the first embodiment") has a main phase represented by, in molar ratio, $R^1{}_2T_{14}B$, and the composition of the main phase may be as follows.

$R^1$ is one or more Y and rare earth elements mandatorily containing Nd. The "mandatorily containing" means that it is possible to contain an element other than the intended elements as long as the effects of the rare earth magnet of the present disclosure and the producing method thereof are not impaired. More specifically, the "mandatorily containing Nd" means that $R^1$ can contain an element other than Nd as long as the effects of the rare earth magnet of the present disclosure and the producing method thereof are not impaired. Typically, out of $R^1$, Nd may be 80 at % or more, 90 at % or more, 95 at % or more, 98 at % or more, or 99 at % or more, and may be even 100 at %. Part or the whole of Nd may be replaced by Pr.

T is one or more transition elements mandatorily containing one or more elements selected from the group consisting of Fe and Co. The "mandatorily containing" means that it is possible to contain an element other than the intended elements as long as the effects of the rare earth magnet of the present disclosure and the producing method thereof are not impaired. More specifically, the "T mandatorily contains one or more elements selected from the group consisting of Fe and Co" means that T can contain a transition element other than Fe and Co as long as the effects of the rare earth magnet of the present disclosure and the producing method thereof are not impaired. Typically, out of T, the total of one or more elements selected from the group consisting of Fe and Co may be 80 at % or more, 90 at % or more, 95 at % or more, 98 at % or more, or 99 at % or more, and may be even 100 at %. The transition element other than Fe and Co includes, for example, Ga, Al and Cu, etc. These elements are present mainly in the grain boundary phase, but part thereof may be present as an interstitial-type or substitution-type element in the main phase.

In addition, the molar ratio of the total of Y, Sc, La and Ce, relative to $R^1$, may be less than 0.10, 0.05 or less, or 0.03 or less, and may be even 0. Also, the molar ratio of Co, relative to T, may be less than 0.1, 0.05 or less, or 0.03 or less, and may be even 0.

When the rare earth magnet precursor of the first embodiment has the above-described composition, the rare earth magnet precursor has excellent balance between the residual magnetization and the coercive force. Then, by allowing a modifier to diffuse and penetrate into the precursor, the rare earth magnet of the present disclosure can further enhance the coercive force.

In the case where the composition (overall composition) of the rare earth magnet precursor is, in molar ratio, $R^1{}_pT_{(100-p-q)}B_q$ (wherein $12.0 \leq p \leq 20.0$ and $5.0 \leq q \leq 20.0$), the molar ratio of the total of Y, Sc, La and Ce relative to $R^1$ and the molar ratio of Co relative to T can be considered to be the same as the molar ratios described above regarding the main phase. Because, the molar ratio of elements constituting each of $R^1$ and T can be regarded as the same between the main phase and the grain boundary phase.

Rare Earth Magnet Precursor Used for Production of Rare Earth Magnet According to Second Embodiment The rare earth magnet precursor used for the production of the rare earth magnet according to the second embodiment (hereinafter sometimes referred to as "rare earth magnet precursor of the second embodiment") has a main phase represented by, in molar ratio, $R^1{}_2T_{14}B$, and the composition of the main phase may be as follows.

$R^1$ is one or more Y and rare earth elements mandatorily containing La and Nd. The "mandatorily containing" means that it is possible to contain an element other than the intended elements as long as the effects of the rare earth magnet of the present disclosure and the producing method thereof are not impaired. More specifically, the "mandatorily containing La and Nd" means that $R^1$ can contain an element other than La and Nd as long as the effects of the rare earth magnet of the present disclosure and the producing method thereof are not impaired. Typically, out of $R^1$, the total of La and Nd may be 80 at % or more, 90 at % or more, 95 at % or more, 98 at % or more, or 99 at % or more, and may be even 100 at %. Part or the whole of Nd may be replaced by Pr.

T is one or more transition elements mandatorily containing one or more elements selected from the group consisting of Fe and Co. The "mandatorily containing" means that it is possible to contain an element other than the intended elements as long as the effects of the rare earth magnet of the present disclosure and the producing method thereof are not impaired. More specifically, the "T mandatorily contains one or more elements selected from the group consisting of Fe and Co" means that T can contain a transition element other than Fe and Co as long as the effects of the rare earth magnet of the present disclosure and the producing method thereof are not impaired. Typically, out of T, the total of one or more elements selected from the group consisting of Fe and Co may be 80 at % or more, 90 at % or more, 95 at % or more, 98 at % or more, or 99 at % or more, and may be even 100 at %. The transition element other than Fe and Co includes, for example, Ga, Al and Cu, etc. These elements are present mainly in the grain boundary phase 20, but part thereof may be present as an interstitial-type or substitution-type element in the main phase 10.

In addition, the molar ratio of the total of Y, Sc and Ce, relative to $R^1$, may be less than 0.1, 0.05 or less, or 0.03 or less, and may be even 0. Also, the molar ratio of La, relative to $R^1$, may be 0.01 or more, 0.02 or more, 0.03 or more, 0.04 or more, or 0.05 or more, and may be 0.20 or less, 0.15 or less, 0.10 or less, 0.08 or less, or 0.06 or less. Furthermore, the molar ratio of Co, relative to T, may be 0.10 or more, 0.15 or more, or 0.20 or more, and may be 0.40 or less, 0.35 or less, 0.30 or less, or 0.25 or less.

The rare earth magnet precursor of the second embodiment has the above-described composition, so that even when inexpensive La is used, the rare earth magnet precursor can suppress the reduction of residual magnetization due to coexistence with Co. Then, by allowing a modifier to diffuse and penetrate into the precursor, the rare earth magnet of the present disclosure can enhance the coercive force.

In the case where the composition (overall composition) of the rare earth magnet precursor is, in molar ratio, $R^1{}_pT_{(100-p-q)}B_q$ (wherein $12.0 \leq p \leq 20.0$ and $5.0 \leq q < 20.0$), the molar ratio of the total of Y, Sc and Ce as well as the molar ratio of La, relative to $R^1$, and the molar ratio of Co relative to T can be considered to be the same as the molar ratios described above regarding the main phase. Because, the molar ratio of elements constituting each of $R^1$ and T can be regarded as the same between the main phase and the grain boundary phase.

Rare Earth Magnet Precursor Used for Production of Rare Earth Magnet According to Third Embodiment The rare earth magnet precursor used for the production of the rare earth magnet according to the third embodiment (hereinafter sometimes referred to as "rare earth magnet precursor of the third embodiment") has a main phase represented by, in molar ratio, $R^1_2T_{14}B$, and the composition of the main phase may be as follows.

$R^1$ is one or more Y and rare earth elements mandatorily containing Ce and Nd. The "mandatorily containing" means that it is possible to contain an element other than the intended elements as long as the effects of the rare earth magnet of the present disclosure and the producing method thereof are not impaired. More specifically, the "mandatorily containing Ce and Nd" means that $R^1$ can contain an element other than Ce and Nd as long as the effects of the rare earth magnet of the present disclosure and the producing method thereof are not impaired. Typically, out of $R^1$, the total of Ce and Nd may be 80 at % or more, 90 at % or more, 95 at % or more, 98 at % or more, or 99 at % or more, and may be even 100 at %. Part or the whole of Nd may be replaced by Pr.

T is one or more transition elements mandatorily containing one or more elements selected from the group consisting of Fe and Co. The "mandatorily containing" means that it is possible to contain an element other than the intended elements as long as the effects of the rare earth magnet of the present disclosure and the producing method thereof are not impaired. More specifically, the "T mandatorily contains one or more elements selected from the group consisting of Fe and Co" means that T can contain a transition element other than Fe and Co as long as the effects of the rare earth magnet of the present disclosure and the producing method thereof are not impaired. Typically, out of T, the total of one or more elements selected from the group consisting of Fe and Co may be 80 at % or more, 90 at % or more, 95 at % or more, 98 at % or more, or 99 at % or more, and may be even 100 at %. The transition element other than Fe and Co includes, for example, Ga, Al and Cu, etc. These elements are present mainly in the grain boundary phase 20, but part thereof may be present as an interstitial-type or substitution-type element in the main phase 10.

The molar ratio of the total of Y, Sc, La and Ce, relative to $R^1$, may be 0.10 or more, 0.20 or more, 0.30 or more, 0.40 or more, or 0.50 or more, and may be 0.90 or less, 0.80 or less, 0.70 or less, or 0.60 or less. Also, the molar ratio of Co, relative to T, may be 0.40 or less, 0.30 or less, 0.20 or less, or 0.10 or less, and may be even 0.

While maintaining residual magnetization and coercive force by using the rare earth magnet precursor of the third embodiment having the above-described composition, that is, a rare earth magnet precursor in which the amount used of Nd is reduced by actively using a light rare earth element, the coercive force can be further enhanced by allowing a modifier to diffuse and penetrate into the precursor.

In the case where the composition (overall composition) of the rare earth magnet precursor is, in molar ratio, $R^1_pT_{(100-p-q)}B_q$ (wherein $12.0 \leq p \leq 20.0$ and $5.0 \leq q < 20.0$), the molar ratio of the total of Y, Sc, La and Ce relative to $R^1$ and the molar ratio of Co relative to T can be considered to be the same as the molar ratios described above regarding the main phase. Because, the molar ratio of elements constituting each of $R^1$ and T can be regarded as the same between the main phase and the grain boundary phase.

Producing Method of Rare Earth Magnet Precursor

The producing method of the rare earth magnet precursor is not particularly limited. Typically, the method includes the following producing method. A molten metal having the composition (overall composition) of the rare earth magnet precursor is cooled to obtain a magnetic ribbon. The magnetic ribbon is pulverized to obtain a magnetic powder. The magnetic powder is compacted to obtain a green compact in a magnetic field. The green compact is then subjected to pressureless sintering to obtain a rare earth magnet precursor. Other than that, without performing sintering, the magnetic ribbon may be used as the rare earth magnet precursor, or the magnetic powder may be used as the rare earth magnet precursor.

The rate at the time of cooling the molten metal having the composition (overall composition) of the rare earth magnet precursor may be, for example, from 1 to 1,000° C./s. When the molten metal is cooled at such a rate, a magnetic ribbon including a main phase having an average particle diameter of 1 to 20 μm is obtained. The main phase having such an average particle diameter is less likely to be coarsened during pressureless sintering of the magnetic powder as well as during diffusion and penetration of the modifier. From this, the average particle diameter of the main phase in the rare earth magnet of the present disclosure (rare earth magnet after diffusion and penetration of the modifier) and the average particle diameter of the main phase in the magnetic powder can be considered to be substantially the same. With respect to an element that may be consumed in the process of obtaining the magnetic ribbon, the consumption may be anticipated.

The method for cooling a molten metal having the composition (overall composition) of the rare earth magnet precursor is not particularly limited. From the viewpoint of obtaining the above-described cooling rate, the method includes, for example, a strip casting method and a book molding method, etc. From the viewpoint that segregation little occurs in the rare earth magnet precursor, a strip casting method is preferred.

The method for pulverizing the magnetic ribbon includes, for example, a method where the magnetic ribbon is coarsely pulverized and then further pulverized by means of a jet mill, etc. The method for coarse pulverization includes, for example, a method using a hammer mill, a method where the magnetic ribbon is hydrogen-embrittled, and a combination thereof, etc.

The molding pressure during compacting of the magnetic powder may be, for example, 50 MPa or more, 100 MPa or more, 200 MPa or more, or 300 MPa or more, and may be 1,000 MPa or less, 800 MPa or less, or 600 MPa or less. The magnetic field applied may be 0.1 T or more, 0.5 T or more, 1.0 T or more, 1.5 T or more, or 2.0 T or more, and may be 10.0 T or less, 8.0 T or less, 6.0 T or less, or 4.0 T or less. When the magnetic powder is thus compacted while applying a magnetic field, anisotropy may be imparted to the rare earth magnet of the present disclosure.

The sintering temperature of the green compact may be, for example, 900° C. or more, 950° C. or more, or 1,000° C. or more, and may be 1,100° C. or less, 1,050° C. or less, or 1,040° C. or less. The sintering time may be, for example, 1 hour or more, 2 hours or more, 3 hours or more, or 4 hours or more, and may be 24 hours or less, 18 hours or less, 12 hours or less, or 6 hours or less. In order to suppress oxidation of the green compact during sintering, the sintering atmosphere is preferably an inert gas atmosphere. The inert gas atmosphere encompasses a nitrogen gas atmosphere.

Modifier Diffusion and Penetration Step

A modifier containing at least $R^2$ and Ce is allowed to diffuse and penetrate inside the rare earth magnet precursor.

As for the composition of the modifier, as long as the modifier contains at least $R^2$ and Ce and can diffuse and penetrate inside the rare earth magnet precursor without coarsening the main phase of the rare earth magnet precursor, the composition of the modifier is not particularly limited. The modifier is, typically, a composition containing at least $R^2$ and Ce and containing a transition element other than a rare earth element. When the modifier is such a composition, the melting point of the modifier can be made lower than those of $R^2$ and Ce, and the modifier can be allowed to diffuse and penetrate inside the rare earth magnet precursor at a relatively low temperature, so that coarsening of the main phase during diffusion and penetration can be avoided.

The composition of the modifier may be, for example, a composition represented by, in molar ratio, $(R^2_{(1-r-s)}Ce_rR^3_s)_{(1-t)}M^1_t$. $R^3$ is one or more elements selected from the group consisting of rare earth elements other than $R^2$ and Ce, and Y. $M^1$ is one or more transition elements other than Y and rare earth elements, and unavoidable impurity elements. That is, $M^1$ is one or more transition elements other than $R^1$, and unavoidable impurity elements. $M^1$ is preferably one or more elements that are alloyed with $R^2$ and Ce, particularly with $R^2$, to make the melting point of the modifier lower than the melting point of $R^2$. Such $M^1$ includes, for example, one or more elements selected from Cu, Al, Co, and Fe. From the viewpoint of lowering the melting point of the modifier, $M^1$ is preferably Cu.

When the content ratio (molar ratio) r of Ce is 0.05 or more, Ce occupies 4f site, and $R^2$ occupies 4g site, thereby contributing enhancement of the coercive force. From this viewpoint, r may be 0.10 or more, 0.20 or more, or 0.30 or more. When r is 0.90 or less, it is unlikely that the content ratio of Ce is excessive and the abundance of $R^2$ is relatively reduced to cause a decrease in the coercive force. From this viewpoint, r may be 0.80 or less, 0.70 or less, 0.60 or less, 0.50 or less, or 0.40 or less. The modifier is allowed to contain $R^3$, i.e., a rare earth element other than $R^2$ and Ce, and Y. The content ratio (molar ratio) s of $R^3$ may be 0.30 or less, 0.20 or less, 0.10 or less, or 0.05 or less, and may be even 0. The content ratio (molar ratio) t of $M^1$ may be appropriately determined such that the temperature when effecting diffusion and penetration of the modifier becomes a temperature at which coarsening of the main phase can be avoided. t may be 0 or more, 0.10 or more, 0.20 or more, or 0.30 or more, and may be 0.90 or less, 0.80 or less, 0.70 or less, 0.60 or less, 0.50 or less, or 0.40 or less. t being 0 means that the modifier is composed of substantially only a rare earth element, and in the case of such a modifier, for example, a gas phase method is applied to the diffusion and penetration of the modifier.

As for the producing method of the modifier, as long as a modifier having the above-described composition is obtained, the producing method of the modifier is not particularly limited. The producing method of the modifier includes, for example, a method of obtaining a ribbon, etc. from a molten metal having the composition of the modifier by using a liquid quenching method or a strip casting method, etc. In this method, since the molten metal is rapidly cooled, segregation is less likely to occur in the modifier. Also, the producing method of the modifier includes, for example, a method where a molten metal having the composition of the modifier is cast in a casting mold such as book mold. In this method, a large amount of modifier is relatively easily obtained. In order to decrease the segregation in the modifier, the book mold is preferably made of a material having a high thermal conductivity. In addition, the casting material is preferably heat-treated for homogenization so as to suppress segregation. Furthermore, the producing method of the modifier includes a method where raw materials of the modifier are loaded into a container, the raw materials are arc-melted in the container, and the melt is cooled to obtain an ingot. In this method, even when the melting point of the raw material is high, the modifier can be relatively easily obtained. From the viewpoint of decreasing segregation in the modifier, the ingot is preferably heat-treated for homogenization.

The method for diffusion and penetration of the modifier inside the rare earth magnet precursor is not particularly limited, but a method where coarsening of the main phase can be avoided is preferred. The method for diffusion and penetration of the modifier includes, typically, a method where, as illustrated in FIGS. 2A to 2C, a modifier 60 is put into contact with a rare earth magnet precursor 50 and then heated and a melt of the modifier 60 is allowed to diffuse and penetrate inside the rare earth magnet precursor 50 (liquid phase method), etc. The diffusion and penetration of the modifier 60 is preferably effected in an inert gas atmosphere. This makes it possible to suppress oxidation of the rare earth magnet precursor 50 and the modifier 60. The inert gas atmosphere encompasses a nitrogen gas atmosphere.

In the case of effecting diffusion and penetration of the modifier by a liquid phase method, the diffusion and penetration temperature (heating temperature) may be, for example, 750° C. or more, 775° C. or more, or 800° C. or more, and may be 1,000° C. or less, 950° C. or less, 925° C. or less, or 900° C. or less. Also, the diffusion and penetration time (heating time) may be, for example, 5 minutes or more, 10 minutes or more, 15 minutes or more, or 30 minutes or more, and may be 180 minutes or less, 150 minutes or less, 120 minutes or less, 90 minutes or less, 60 minutes or less, or 40 minutes or less.

The diffusion and penetration amount of the modifier may be appropriately determined so that a desired amount of $R^2$ can occupy 4f site. Typically, the amount of the modifier, per 100 parts by mol of the rare earth magnet precursor, may be 0.1 parts by mol or more, 1.0 parts by mol or more, 2.0 parts by mol or more, 2.5 parts by mol or more, or 3.0 parts by mol or more, and may be 15.0 parts by mol or less, 10.0 parts by mol or less, or 5.0 parts by mol or less.

The method for allowing the modifier to diffuse and penetrate inside the rare earth magnet precursor includes, for example, a gas phase method, in addition to the liquid phase method above. In the gas phase method, the modifier is vaporized in a vacuum to allow the modifier to diffuse and penetrate inside the rare earth magnet precursor. In the case of effecting diffusion and penetration of the modifier by a gas phase method, as for the composition of the modifier, for example, when using a composition represented by, in molar ratio, $(R^2_{(1-r-s)}Ce_rR^3_s)_{(1-t)}M^1_t$, t is preferably 0. This can minimize the inclusion of $M^1$ remaining in the grain boundary phase and contributes to enhancement of the residual magnetization.

In the case of effecting diffusion and penetration of the modifier by a gas phase method, the diffusion and penetration temperature may be, for example, 850° C. or more, 875° C. or more, or 900° C. or more, and may be 1,000° C. or less, 950° C. or less, or 925° C. or less. The diffusion and penetration time may be 5 minutes or more, 10 minutes or more, 15 minutes or more, or 30 minutes or more, and may be 180 minutes or less, 150 minutes or less, 120 minutes or less, 90 minutes or less, 60 minutes or less, or 40 minutes or less. The diffusion and penetration amount of the modifier may follow the case of the liquid phase method.

Auxiliary Modifier Diffusion and Penetration Step

Figure 6A:
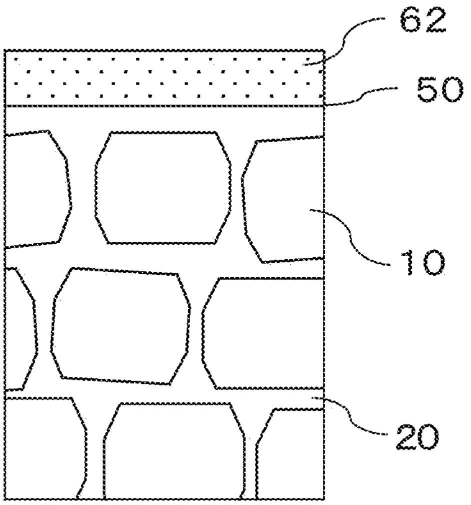
FIG. 6A is an explanatory diagram schematically illustrating one example of the state in which an auxiliary modifier is put into contact with a rare earth magnet precursor.
Figure 6B:
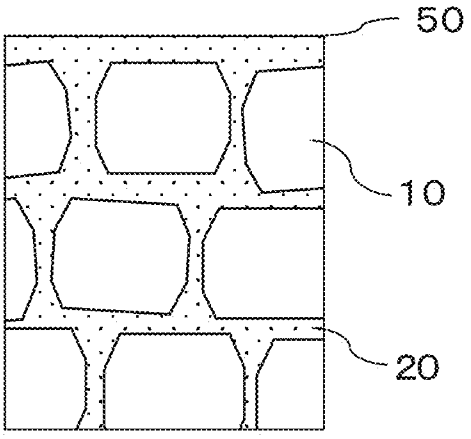
FIG. 6B is an explanatory diagram schematically illustrating one example of the state in which an auxiliary modifier has diffused and penetrated into the grain boundary phase of a rare earth magnet precursor.
Figure 6C:
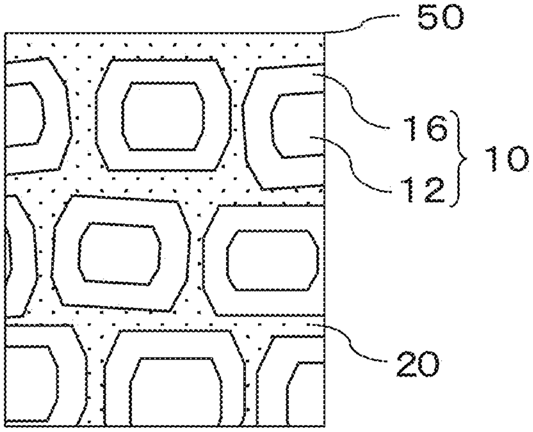
FIG. 6C is an explanatory diagram schematically illustrating one example of the state in which a secondary shell is formed in the main phase.
Figure 6D:
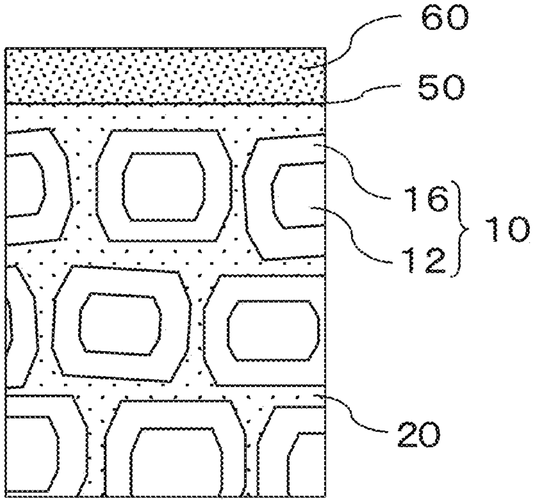
FIG. 6D is an explanatory diagram schematically illustrating one example of the state in which a modifier is put into contact with a rare earth magnet precursor having a main phase where a secondary shell is formed.
Figure 6E:
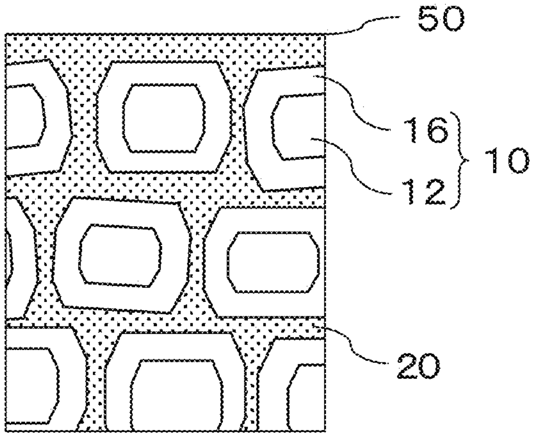
FIG. 6E is an explanatory diagram schematically illustrating one example of the state in which a modifier has diffused and penetrated into the grain boundary phase of a rare earth magnet precursor where a secondary shell is formed in the main phase.
Figure 6F:
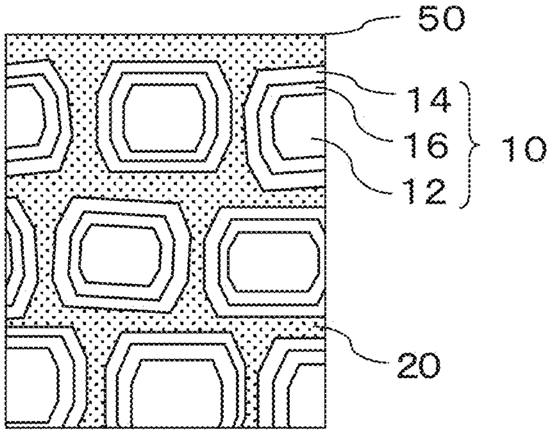
FIG. 6F is an explanatory diagram schematically illustrating one example of the state in which a core/secondary shell/shell structure is formed in the main phase.

The producing method of the rare earth magnet of the present disclosure may optionally includes an auxiliary modifier diffusion and penetration step. In the following, an auxiliary modifier diffusion and penetration step is described by referring to the drawings. FIG. 6A is an explanatory diagram schematically illustrating one example of the state in which an auxiliary modifier is put into contact with a rare earth magnet precursor. FIG. 6B is an explanatory diagram schematically illustrating one example of the state in which an auxiliary modifier has diffused and penetrated into the grain boundary phase of a rare earth magnet precursor. FIG. 6C is an explanatory diagram schematically illustrating one example of the state in which a secondary shell is formed in the main phase. FIG. 6D is an explanatory diagram schematically illustrating one example of the state in which a modifier is put into contact with a rare earth magnet precursor having a main phase where a secondary shell is formed. FIG. 6E is an explanatory diagram schematically illustrating one example of the state in which a modifier has diffused and penetrated into the grain boundary phase of a rare earth magnet precursor where a secondary shell is formed in the main phase. FIG. 6F is an explanatory diagram schematically illustrating one example of the state in which a core/secondary shell/shell structure is formed in the main phase.

As illustrated in FIGS. 6A to 6F, before the modifier 60 diffuses and penetrates inside the rare earth magnet precursor 50, an auxiliary modifier 62 is allowed to diffuse and penetrate into the rare earth magnet precursor 50. More specifically, as illustrated in FIG. 6A, an auxiliary modifier 62 is put into contact with the surface of the rare earth magnet precursor 50 having a single-phase main phase 10. When the precursor is heated in this state, as illustrated in FIG. 6B, the auxiliary modifier 62 diffuses and penetrates into the grain boundary phase 20. Then, as illustrated in FIG. 6C, the auxiliary modifier 62 having diffused and penetrated into the grain boundary phase 20 further diffuses and penetrates into the outer periphery of the main phase 10 to form a core part 12 and a secondary shell part 16. At this time, part of rare earth elements present in the outer periphery of the main phase 10 is exchanged with part of rare earth elements of the auxiliary modifier 62 having diffused and penetrated into the grain boundary phase 20, and a secondary shell part 16 is thereby formed. On the other hand, the core part 12 maintains the same composition as that of the single-phase main phase 10.

As illustrated in FIG. 6D, a modifier 60 is put into contact with the surface of the rare earth magnet precursor 50 having a main phase 10 in which the secondary shell part 16 is formed. When the precursor is heated in this state, as illustrated in FIG. 6E, the modifier 60 diffuses and penetrates into the grain boundary phase 20. Then, as illustrated in FIG. 6F, the modifier 60 having diffused and penetrated into the grain boundary phase 20 further diffuses and penetrates into the outer periphery of the secondary shell part 16 to form a secondary shell part 16 and a shell part 14. At this time, part of rare earth elements present in the outer periphery of the secondary shell part 16 is exchanged with part of rare earth elements of the modifier 60 having diffused and penetrated into the grain boundary phase 20, and a shell part 14 is thereby formed. On the other hand, the secondary shell part 16 maintains the composition before the diffusion and penetration of the modifier 60.

The auxiliary modifier 62 contains at least $R^4$. As described above, $R^4$ is one or more elements selected from the group consisting of Pr, Nd, Pm, Sm and Eu. In the auxiliary modifier, it is preferable to reduce the content of $R^2$ as much as possible. $R^2$ is an expensive element having high rarity but is highly effective in enhancing the anisotropic magnetic field. When an element highly effective in enhancing the anisotropic magnetic field is present at the outermost border of the main phase 10, its contribution to enhancement of the coercive force increases. For this reason, in the secondary shell part, the content ratio of $R^2$ is preferably as low as possible.

Addition of the auxiliary modifier diffusion and penetration step is effective particularly in the case of using a rare earth magnet precursor in which, like the rare earth magnet according to the third embodiment, the amount used of Nd is decreased by actively using a light rare earth element. When the amount used of a light rare earth element increases, the residual magnetization and the coercivity are reduced. However, by effecting diffusion and penetration of an auxiliary modifier containing $R^4$, i.e., a medium rare earth element, reduction in the residual magnetization and anisotropic magnetic field can be compensated for. Compared with a light rare earth element, the medium rare earth element has high rarity and is expensive. A medium rare earth element advantageous to residual magnetization and anisotropic magnetic field is allowed to exist at a larger ratio in the outer secondary shell part than in the core part, whereby the residual magnetization and anisotropic magnetic field can be enhanced with a small amount of a medium rare earth element. In particular, this configuration can enhance the anisotropic magnetic field and therefore, greatly contributes to enhancement of the coercive force.

The composition of the auxiliary modifier may be, for example, a composition represented by, in molar ratio, $(R^4_{(1-i)}R^5_{i})_{(1-j)}M^2_{j}$. $R^5$ is one or more elements selected from the group consisting of Y other than $R^4$, and rare earth elements. $M^2$ is one or more transition elements other than Y and rare earth elements, and unavoidable impurity elements. That is, $M^2$ is one or more transition elements other than $R^1$, and unavoidable impurity elements. $M^2$ is preferably one or more elements that are alloyed with $R^4$ to make the melting point of the modifier lower than the melting point of $R^4$. Such $M^2$ includes, for example, one or more elements selected from Cu, Al, Co, and Fe. From the viewpoint of lowering the melting point of the modifier, $M^2$ is preferably Cu.

The auxiliary modifier is allowed to contain $R^5$, i.e., Y other than $R^4$, and rare earth elements. The content ratio (molar ratio) i of $R^5$ may be 0.30 or less, 0.20 or less, 0.10 or less, or 0.05 or less, and may be even 0. Also, the content ratio (molar ratio) j of $M^2$ may be appropriately determined such that the temperature when effecting diffusion and penetration of the auxiliary modifier becomes a temperature at which coarsening of the main phase can be avoided. j may be 0 or more, 0.10 or more, 0.20 or more, or 0.30 or more, and may be 0.90 or less, 0.80 or less, 0.70 or less, 0.60 or less, 0.50 or less, or 0.40 or less. j being 0 means that the modifier is composed of substantially only a rare earth element, and in the case of such a modifier, for example, a gas phase method is applied to the diffusion and penetration of the modifier.

The method for allowing the auxiliary modifier to diffuse and penetrate inside the rare earth magnet precursor is not particularly limited, but a method where coarsening of the main phase can be avoided is preferred. The method for effecting diffusion and penetration of the auxiliary modifier is typically a liquid phase method. The diffusion and penetration of the auxiliary modifier is preferably effected in an inert gas atmosphere. This makes it possible to suppress oxidation of the rare earth magnet precursor and the auxiliary modifier. The inert gas atmosphere encompasses a nitrogen gas atmosphere.

In the case of effecting diffusion and penetration of the auxiliary modifier by a liquid phase method, the diffusion and penetration temperature (heating temperature) may be, for example, 750° C. or more, 775° C. or more, or 800° C. or more, and may be 1,000° C. or less, 950° C. or less, 925° C. or less, or 900° C. or less. The diffusion and penetration time (heating time) may be 5 minutes or more, 10 minutes or more, 15 minutes or more, or 30 minutes or more, and may be 240 minutes or less, 180 minutes or less, 165 minutes or less, 150 minutes or less, 120 minutes or less, 90 minutes or less, 60 minutes or less, or 40 minutes or less.

The diffusion and penetration amount of the auxiliary modifier may be appropriately determined so that a desired amount of $R^4$ can occupy the secondary shell part. Typically, the amount of the auxiliary modifier, per 100 parts by mol of the rare earth magnet precursor, may be 0.1 parts by mol or more, 1.0 parts by mol or more, 2.0 parts by mol or more, 2.5 parts by mol or more, or 3.0 parts by mol or more, and may be 15.0 parts by mol or less, 10.0 parts by mol or less, or 5.0 parts by mol or less.

The method for allowing the auxiliary modifier to diffuse and penetrate inside the rare earth magnet precursor includes, for example, a gas phase method, in addition to the liquid phase method above. In the gas phase method, the auxiliary modifier is vaporized in a vacuum to allow the auxiliary modifier to diffuse and penetrate inside the rare earth magnet precursor. In the case of effecting diffusion and penetration of the modifier by a gas phase method, as for the composition of the auxiliary modifier, for example, when using a composition represented by, in molar ratio, $(R^4_{(1-i)}R^5_i)_{(1-j)}M^2_j$, j is preferably 0. This can minimize the inclusion of $M^2$ remaining in the grain boundary phase and contributes to enhancement of the residual magnetization.

In the case of effecting diffusion and penetration of the auxiliary modifier by a gas phase method, the diffusion and penetration temperature may be, for example, 850° C. or more, 875° C. or more, or 900° C. or more, and may be 1,000° C. or less, 950° C. or less, or 925° C. or less. The diffusion and penetration time may be 5 minutes or more, 10 minutes or more, 15 minutes or more, or 30 minutes or more, and may be 180 minutes or less, 150 minutes or less, 120 minutes or less, 90 minutes or less, 60 minutes or less, or 40 minutes or less. The diffusion and penetration amount of the auxiliary modifier may follow the case of the liquid phase method.

As for the producing method of the auxiliary modifier, as long as a modifier having the above-described composition is obtained, the producing method of the auxiliary modifier is not particularly limited. Also, as for the producing method of the auxiliary modifier, the producing method of the modifier can be referred to.

The rare earth magnet obtained by the producing method described hereinbefore has an overall composition represented by, in molar ratio, $R^1_pT_{(100-p-q)}B_q\cdot((R^2_{(1-r-s)}Ce_rR^3_s)_{(1-t)}M^1_t)_m\cdot(R^4_{(1-i)}R^5_i)_{(1-j)}Mh^2_j)_n$. In this formula, $R^1_pT_{(100-p-q)}B_q$ is derived from the rare earth magnet precursor, $(R^2_{(1-r-s)}Ce_rR^3_s)_{(1-t)}M^1_t$ is derived from the modifier, and $(R^4_{(1-i)}R^5_i)_{(1-j)}M^2_j$ is derived from the auxiliary modifier. Also, m and n correspond to the diffusion penetration amounts (parts by mol) of the modifier and the auxiliary modifier, respectively, relative to 100 parts by mol of the rare earth magnet precursor.

Modification

Other than those described hereinbefore, in the rare earth magnet of the present disclosure and the producing method thereof, various modifications can be added within the scope of contents set forth in claims. The modification includes, for example, a modification of using, as the modifier, a fluoride containing at least $R^2$ and Ce and allowing the modifier to diffuse and penetrate inside the rare earth magnet precursor by a gas phase method. This makes it possible to, in the rare earth magnet of the present disclosure, reduce the content ratios of the rare earth element and the element other than iron group elements and enhance the residual magnetization. Also, before the diffusion and penetration of the modifier, the rare earth magnet precursor may be heat-treated for homogenization at 800 to 1,050° C. over 1 to 24 hours. By this treatment, segregation in the rare earth magnet precursor can be suppressed. Furthermore, a so-called heat treatment for optimization may be performed before and after the diffusion and penetration of the modifier. As for the conditions of the heat treatment for optimization, for example, the precursor is held at 850 to 1,000° C. over 50 to 300 minutes and then cooled at a rate of 0.1 to 5.0° C./min to a range of 450 to 700° C.

EXAMPLES

The rare earth magnet of the present disclosure and the producing method thereof are described more specifically by referring to Examples and Comparative Examples. Note that the rare earth magnet of the present disclosure and the producing method thereof are not limited to the conditions employed in the following Examples.

Preparation of Sample

Samples of Examples 1 to 18, Comparative Examples 1 to 3, and Reference Examples 1 to 3 were prepared according to the following procedure.

Preparation of Sample of Example 1

A rare earth magnet precursor having an overall composition represented by, in molar ratio, $(Nd_{0.81}Pr_{0.19})_{14}(Fe_{0.99}Co_{0.01})_{79.3}B_{5.9}Ga_{0.4}Al_{0.2}Cu_{0.2}$ was prepared. This rare earth magnet precursor was prepared based on a magnetic ribbon obtained by cooling a molten metal having a composition represented by, in molar ratio, $(Nd_{0.81}Pr_{0.19})_{14}(Fe_{0.99}Co_{0.01})_{79.3}B_{5.9}Ga_{0.4}Al_{0.2}Cu_{0.2}$ by a strip casting method. The magnetic ribbon was hydrogen-pulverized and then further pulverized by means of a jet mill to obtain a magnetic powder. The obtained magnetic powder was compacted while applying a magnetic field of 2T to obtain a green compact. The obtained green compact was subjected to pressureless sintering at 1,050° C. over 4 hours to obtain a rare earth magnet precursor. The composition of the main phase in the obtained rare earth magnet precursor was $(Nd_{0.81}Pr_{0.19})_2(Fe_{0.99}Co_{0.01})_{14}B$. Most of Ga, Al and Cu in the molten metal were present in the grain boundary phase, and the contents of Ga, Al and Cu in the main phase were below the measurement limit. Also, the average particle diameter of the main phase was 4.9 μm.

A modifier was allowed to diffuse and penetrate into the thus-obtained rare earth magnet precursor to obtain the sample of Example 1. The composition of the modifier was $(Tb_{0.9}Ce_{0.1})_{0.7}Cu_{0.3}$. The diffusion and penetration temperature was 950° C., and the diffusion and penetration time was 15 minutes. 2.5 Parts by mol of the modifier was allowed to diffuse and penetrate per 100 parts by mol of the rare earth magnet precursor.

Preparation of Samples of Examples 2 to 5

The samples of Examples 2 to 5 were prepared in the same manner as in Example 1 other than the compositions of the modifiers of Examples 2 to 5 were $(Tb_{0.8}Ce_{0.2})_{0.7}Cu_{0.3}$, $(Tb_{0.7}Ce_{0.3})_{0.7}Cu_{0.3}$, $(Tb_{0.6}Ce_{0.4})_{0.7}Cu_{0.3}$, and $(Tb_{0.4}Ce_{0.6})_{0.7}Cu_{0.3}$, respectively. Incidentally, the samples of Examples 1 to 5 correspond to the rare earth magnet according to the first embodiment.

Preparation of Sample of Comparative Example 1

The sample of Comparative Example 1 was prepared in the same manner as in Example 1 other than the composition of the modifier is $Tb_{0.7}Cu_{0.3}$.

Preparation of Sample of Reference Example 1

The sample of Reference Example 1 was prepared in the same manner as in Example 1 other than the composition of the modifier is $Ce_{0.7}Cu_{0.3}$.

Preparation of Sample of Example 6

A rare earth magnet precursor having an overall composition represented by, in molar ratio, $(Nd_{0.77}Pr_{0.18}La_{0.05})_{14.4}(Fe_{0.8}Co_{0.2})_{79.1}B_{5.7}Ga_{0.4}Al_{0.2}$Cu0.2 was prepared. This rare earth magnet precursor was prepared based on a magnetic ribbon obtained by cooling a molten metal having a composition represented by, in molar ratio, $(Nd_{0.77}Pr_{0.18}La_{0.05})_{14.4}(Fe_{0.8}Co_{0.2})_{79.1}B_{5.7}Ga_{0.4}Al_{0.2}Cu_{0.2}$ by a strip casting method. The magnetic ribbon was hydrogen-pulverized and then further pulverized by means of a jet mill to obtain a magnetic powder. The obtained magnetic powder was compacted while applying a magnetic field of 2T to obtain a green compact. The obtained green compact was subjected to pressureless sintering at 1,050° C. over 4 hours to obtain a rare earth magnet precursor. The composition of the main phase in the obtained rare earth magnet precursor was $(Nd_{0.77}Pr_{0.18}La_{0.05})_2(Fe_{0.8}Co_{0.2})_{14}B$. Most of Ga, Al and Cu in the molten metal were present in the grain boundary phase, and the contents of Ga, Al and Cu in the main phase were below the measurement limit. Also, the average particle diameter of the main phase was 5.2 μm.

A modifier was allowed to diffuse and penetrate into the thus-obtained rare earth magnet precursor to obtain the sample of Example 6. The composition of the modifier was $(Tb_{0.9}Ce_{0.1})_{0.7}Cu_{0.3}$. The diffusion and penetration temperature was 950° C., and the diffusion and penetration time was 15 minutes. 2.5 Parts by mol of the modifier was allowed to diffuse and penetrate per 100 parts by mol of the rare earth magnet precursor.

Preparation of Samples of Examples 7 to 11

The samples of Examples 7 to 11 were prepared in the same manner as in Example 6 other than the compositions of the modifiers of Examples 7 to 11 were $(Tb_{0.7}Ce_{0.3})_{0.7}Cu_{0.3}$, $(Tb_{0.6}Ce_{0.4})_{0.7}Cu_{0.3}$, $(Tb_{0.5}Ce_{0.5})_{0.7}Cu_{0.3}$, $(Tb_{0.4}Ce_{0.6})_{0.7}Cu_{0.3}$, and $(Tb_{0.3}Ce_{0.7})_{0.7}Cu_{0.3}$, respectively. Incidentally, the samples of Examples 6 to 11 correspond to the rare earth magnet according to the second embodiment.

Preparation of Sample of Comparative Example 2

The sample of Comparative Example 2 was prepared in the same manner as in Example 6 other than the composition of the modifier is $Tb_{0.7}Cu_{0.3}$.

Preparation of Sample of Reference Example 2

The sample of Reference Example 2 was prepared in the same manner as in Example 6 other than the composition of the modifier is $Ce_{0.7}Cu_{0.3}$.

Preparation of Sample of Example 12

A rare earth magnet precursor having an overall composition represented by, in molar ratio, $(Nd_{0.5}Ce_{0.375}La_{0.125})_{13.1}Fe_{80.5}B_6Cu_{0.1}Ga_{0.3}$ was prepared. This rare earth magnet precursor was prepared based on a magnetic ribbon obtained by cooling a molten metal having a composition represented by, in molar ratio, $(Nd_{0.5}Ce_{0.375}La_{0.125})_{13.1}Fe_{80.5}B_6Cu_{0.1}Ga_{0.3}$ by a strip casting method. The magnetic ribbon was hydrogen-pulverized and then further pulverized by means of a jet mill to obtain a magnetic powder. The obtained magnetic powder was compacted while applying a magnetic field of 2T to obtain a green compact. The obtained green compact was subjected to pressureless sintering at 1,050° C. over 4 hours to obtain a rare earth magnet precursor. The composition of the main phase in the obtained rare earth magnet precursor was $(Nd_{0.5}Ce_{0.375}La_{0.125})_2Fe_{14}B$. Most of Ga and Cu in the molten metal were present in the grain boundary phase, and the contents of Ga and Cu in the main phase were below the measurement limit. Also, the average particle diameter of the main phase was 5.0

An auxiliary modifier was allowed to diffuse and penetrate into the thus-obtained rare earth magnet precursor. The composition of the auxiliary modifier was $Nd_{0.9}Cu_{0.1}$. The diffusion and penetration temperature was 950° C., and the diffusion and penetration time was 165 minutes. 4.7 Parts by mol of the modifier was allowed to diffuse and penetrate per 100 parts by mol of the rare earth magnet precursor. The composition of the secondary shell part after the diffusion and penetration of the auxiliary modifier was $(Nd_{0.91}Ce_{0.08}La_{0.01})_2Fe_{14}B$.

A modifier was further allowed to diffuse and penetrate into the rare earth magnet precursor having a secondary shell part to obtain the sample of Example 12. The composition of the modifier was $(Tb_{0.9}Ce_{0.1})_{0.7}Cu_{0.3}$. The diffusion and penetration temperature was 950° C., and the diffusion and penetration time was 15 minutes. 2.5 Parts by mol of the modifier was allowed to diffuse and penetrate per 100 parts by mol of the rare earth magnet precursor.

Preparation of Samples of Examples 13 to 18

The samples of Examples 13 to 18 were prepared in the same manner as in Example 12 other than the compositions of the modifiers of Examples 13 to 18 were $(Tb_{0.8}Ce_{0.2})_{0.7}Cu_{0.3}$, $(Tb_{0.7}Ce_{0.3})_{0.7}Cu_{0.3}$, $(Tb_{0.6}Ce_{0.4})_{0.7}Cu_{0.3}$, $(Tb_{0.5}Ce_{0.5})_{0.7}Cu_{0.3}$, $(Tb_{0.4}Ce_{0.6})_{0.7}Cu_{0.3}$, and $(Tb_{0.3}Ce_{0.7})_{0.7}Cu_{0.3}$, respectively. Incidentally, the samples of Examples 12 to 18 correspond to the rare earth magnet according to the third embodiment.

Preparation of Sample of Comparative Example 3

The sample of Comparative Example 3 was prepared in the same manner as in Example 12 other than the composition of the modifier is $Tb_{0.7}Cu_{0.3}$.

Preparation of Sample of Reference Example 3

The sample of Reference Example 3 was prepared in the same manner as in Example 12 other than the composition of the modifier is $Ce_{0.7}Cu_{0.3}$.

Evaluation

The magnetic properties of each sample were measured at 300 K by using Vibrating Sample Magnetometer (VSM). In the case of effecting diffusion and penetration of an auxiliary modifier, the magnetic properties were measured before and after the diffusion and penetration. In addition, the composition of the shell part was analyzed using Cs-STEM-EDX (Cs Corrected-Scanning Transmission Electron Microscope-Energy Dispersive X-ray spectroscope; spherical aberration-corrected scanning transmission electron microscopy-energy dispersive X-ray spectrometry), and $R^2_{4g}/(R^2_{4f}+R^2_{4g})$ and $(Ce_{4f}+Ce_{4g})/(R^2_{4f}+R^2_{4g})$ were determined. At the analysis, an electron beam was made incident on the sample from the [110] direction. As a result, 4f site and 4g site of $R^1$ are alternately aligned, so that composition analysis of each site can be performed with the resolution at an atomic level.

Figure 7:
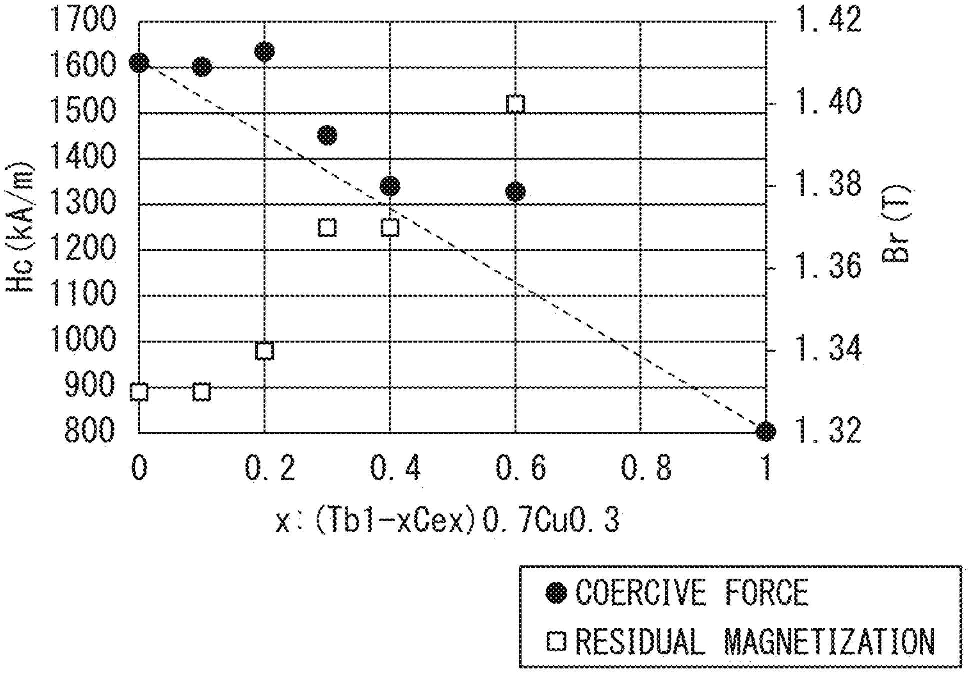
FIG. 7 is a graph illustrating the relationship between the molar ratio of Ce in the modifier and the coercive force with respect to the samples of Table 1.
Figure 8:
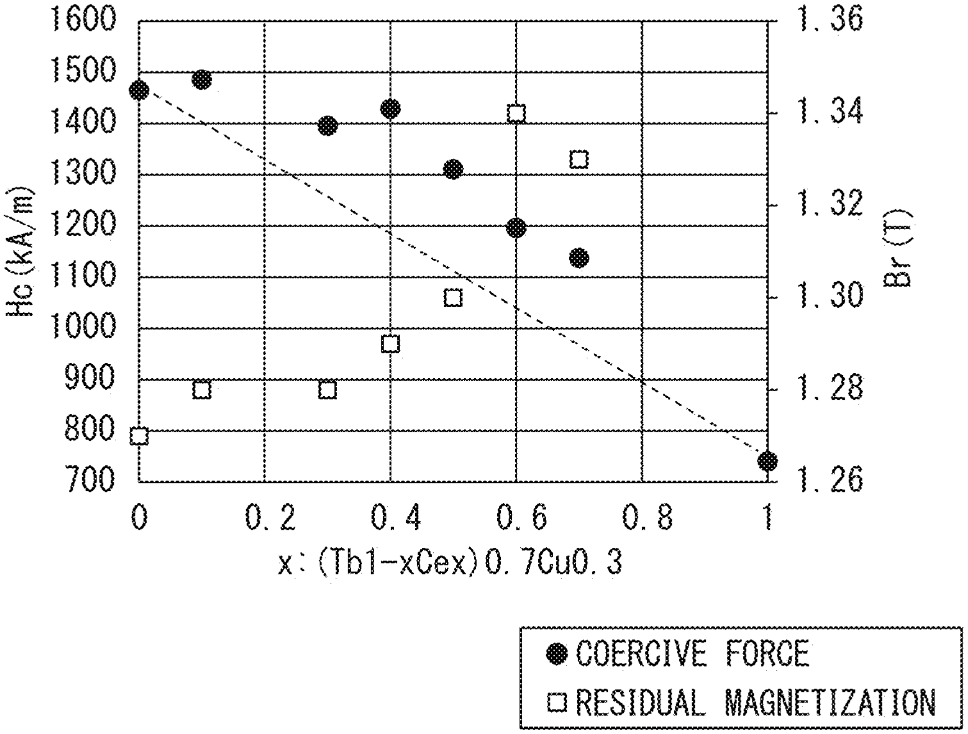
FIG. 8 is a graph illustrating the relationship between the molar ratio of Ce in the modifier and the coercive force with respect to the samples of Table 2.
Figure 9:
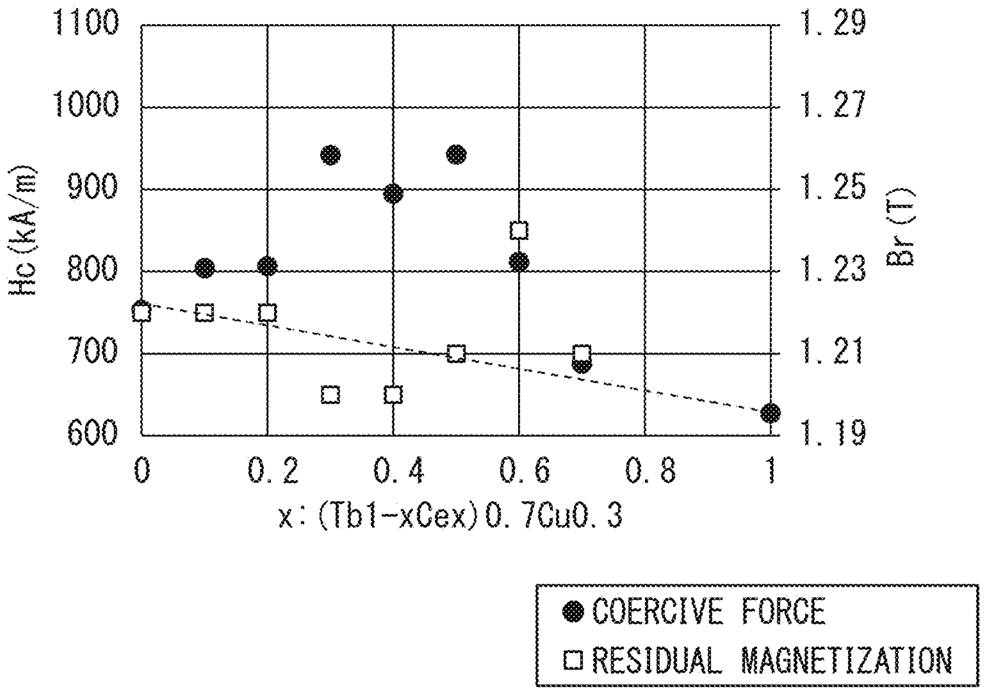
FIG. 9 is a graph illustrating the relationship between the molar ratio of Ce in the modifier and the coercive force with respect to the samples of Table 3.
Figure 10:
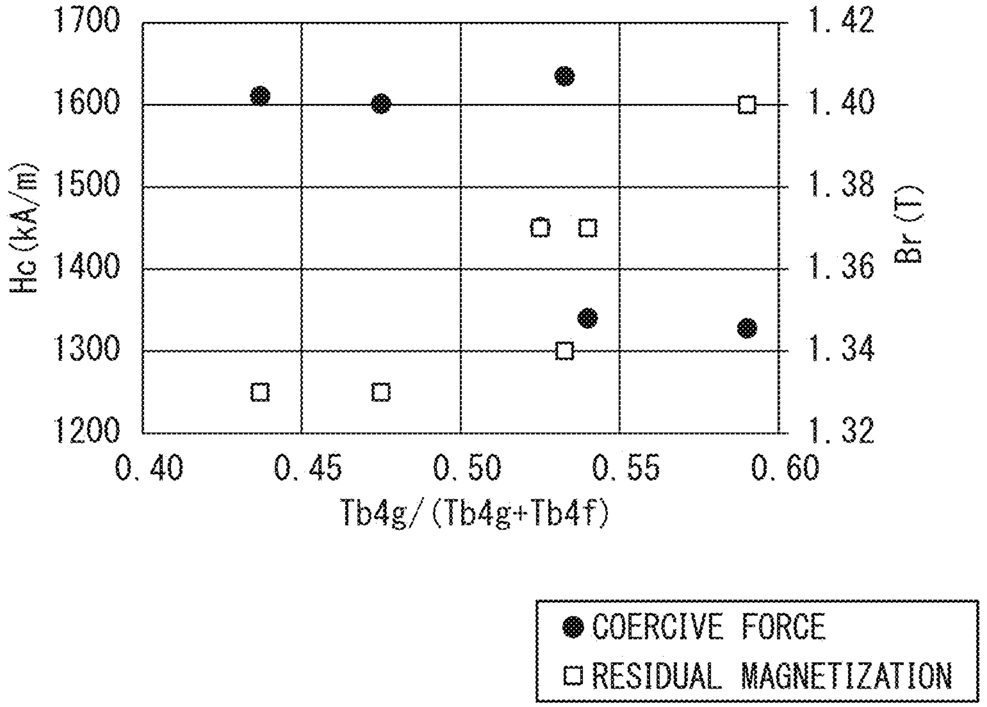
FIG. 10 is a graph illustrating the relationship between $R^2_{4g}/(R^2_{4f}+R^2_{4g})$ and the coercive force with respect to the samples of Table 1.
Figure 11:
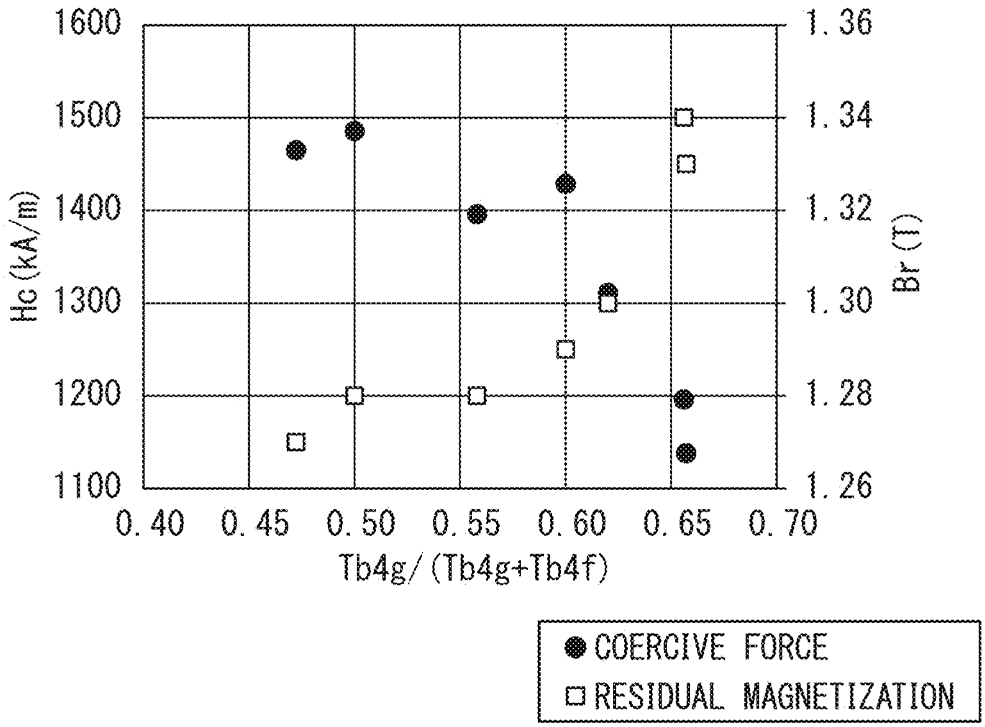
FIG. 11 is a graph illustrating the relationship between $R^2_{4g}/(R^2_{4f}+R^2_{4g})$ and the coercive force with respect to the samples of Table 2.
Figure 12:
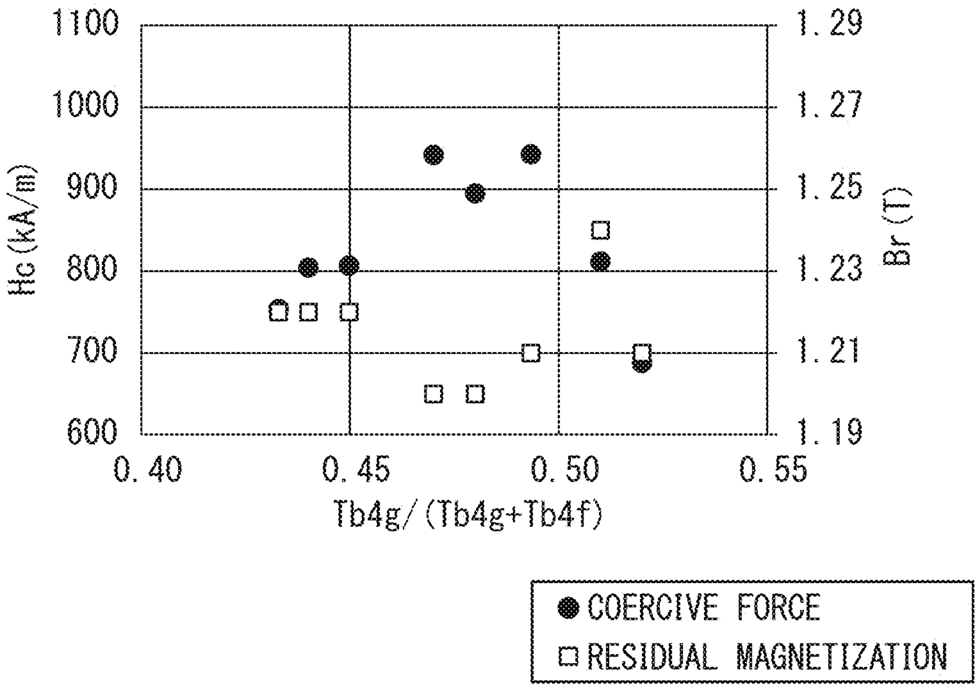
FIG. 12 is a graph illustrating the relationship between $R^2_{4g}/(R^2_{4f}+R^2_{4g})$ and the coercive force with respect to the samples of Table 3.

The results are shown in Tables 1 to 3. FIG. 7 is a graph illustrating the relationship between the molar ratio of Ce in the modifier and the coercive force with respect to the samples of Table 1. FIG. 8 is a graph illustrating the relationship between the molar ratio of Ce in the modifier and the coercive force with respect to the samples of Table 2. FIG. 9 is a graph illustrating the relationship between the molar ratio of Ce in the modifier and the coercive force with respect to the samples of Table 3. FIG. 10 is a graph illustrating the relationship between $R^2_{4g}/(R^2_{4f}+R^2_{4g})$ and the coercive force with respect to the samples of Table 1. FIG. 11 is a graph illustrating the relationship between $R^2_{4g}/(R^2_{4f}+R^2_{4g})$ and the coercive force with respect to the samples of Table 2. FIG. 12 is a graph illustrating the relationship between $R^2_{4g}/(R^2_{4f}+R^2_{4g})$ and the coercive force with respect to the samples of Table 3.

TABLE 1

| | Rare Earth Magnet Precursor | |
|---|---|---|
| | Composition of Core Part (molar ratio) | Coercive Force (kA/m) |
| Comparative Example 1 | $(Nd_{0.81}Pr_{0.19})_2(Fe_{0.99}Co_{0.01})_{14}B$ | 803 |
| Example 1 | $(Nd_{0.81}Pr_{0.19})_2(Fe_{0.99}Co_{0.01})_{14}B$ | 803 |
| Example 2 | $(Nd_{0.81}Pr_{0.19})_2(Fe_{0.99}Co_{0.01})_{14}B$ | 803 |
| Example 3 | $(Nd_{0.81}Pr_{0.19})_2(Fe_{0.99}Co_{0.01})_{14}B$ | 803 |
| Example 4 | $(Nd_{0.81}Pr_{0.19})_2(Fe_{0.99}Co_{0.01})_{14}B$ | 803 |
| Example 5 | $(Nd_{0.81}Pr_{0.19})_2(Fe_{0.99}Co_{0.01})_{14}B$ | 803 |
| Reference Example 1 | $(Nd_{0.81}Pr_{0.19})_2(Fe_{0.99}Co_{0.01})_{14}B$ | 803 |

TABLE 2

| | Modifier | | | | | Magnetic Properties | |
|---|---|---|---|---|---|---|---|
| | | | Penetration | | | After Modification | |
| | Composition (molar ratio) | Substitution Ratio of Ce | Amount (parts by mol) | Penetration Temperature (° C.) | Penetration Time (min) | Coercive Force (kA/m) | Residual Magnetization (T) |
| Comparative Example 1 | $Tb_{0.7}Cu_{0.3}$ | 0 | 2.5 | 950 | 15 | 1611 | 1.33 |
| Example 1 | $(Tb_{0.9}Ce_{0.1})_{0.7}Cu_{0.3}$ | 0.1 | 2.5 | 950 | 15 | 1601 | 1.33 |
| Example 2 | $(Tb_{0.8}Ce_{0.2})_{0.7}Cu_{0.3}$ | 0.2 | 2.5 | 950 | 15 | 1635 | 1.34 |
| Example 3 | $(Tb_{0.7}Ce_{0.3})_{0.7}Cu_{0.3}$ | 0.3 | 2.5 | 950 | 15 | 1451 | 1.37 |
| Example 4 | $(Tb_{0.6}Ce_{0.4})_{0.7}Cu_{0.3}$ | 0.4 | 2.5 | 950 | 15 | 1340 | 1.37 |
| Example 5 | $(Tb_{0.4}Ce_{0.6})_{0.7}Cu_{0.3}$ | 0.6 | 2.5 | 950 | 15 | 1328 | 1.40 |
| Reference Example 1 | $Ce_{0.7}Cu_{0.3}$ | 1 | 2.5 | 950 | 15 | 803 | — |

TABLE 3

| | Microstructure After Modification | | |
|---|---|---|---|
| | $Tb_{4g}/(Tb_{4g}+Tb_{4f})$ | $(Ce_{4g}+Ce_{4f})/(Tb_{4g}+Tb_{4f})$ | Composition of Shell Part |
| Comparative Example 1 | 0.44 | 0.00 | $(Nd_{0.59}Pr_{0.14}Tb_{0.27}Ce_{0})_2(Fe_{0.99}Co_{0.01})_{14}B$ |
| Example 1 | 0.48 | 0.06 | $(Nd_{0.50}Pr_{0.12}Tb_{0.36}Ce_{0.02})_2(Fe_{0.99}Co_{0.01})_{14}B$ |
| Example 2 | 0.53 | 0.13 | $(Nd_{0.46}Pr_{0.11}Tb_{0.38}Ce_{0.05})_2(Fe_{0.99}Co_{0.01})_{14}B$ |
| Example 3 | 0.53 | 0.27 | $(Nd_{0.51}Pr_{0.12}Tb_{0.29}Ce_{0.08})_2(Fe_{0.99}Co_{0.01})_{14}B$ |
| Example 4 | 0.54 | 0.37 | $(Nd_{0.43}Pr_{0.10}Tb_{0.34}Ce_{0.13})_2(Fe_{0.99}Co_{0.01})_{14}B$ |
| Example 5 | 0.59 | 0.50 | $(Nd_{0.52}Pr_{0.12}Tb_{0.24}Ce_{0.12})_2(Fe_{0.99}Co_{0.01})_{14}B$ |
| Reference Example 1 | — | — | — |

TABLE 4

| | Rare Earth Magnet Precursor | |
|---|---|---|
| | Composition of Core Part (molar ratio) | Coercive Force (kA/m) |
| Comparative Example 2 | $(Nd_{0.77}Pr_{0.18}La_{0.05})_2(Fe_{0.8}Co_{0.2})_{14}B$ | 740 |
| Example 6 | $(Nd_{0.77}Pr_{0.18}La_{0.05})_2(Fe_{0.8}Co_{0.2})_{14}B$ | 740 |
| Example 7 | $(Nd_{0.77}Pr_{0.18}La_{0.05})_2(Fe_{0.8}Co_{0.2})_{14}B$ | 740 |
| Example 8 | $(Nd_{0.77}Pr_{0.18}La_{0.05})_2(Fe_{0.8}Co_{0.2})_{14}B$ | 740 |
| Example 9 | $(Nd_{0.77}Pr_{0.18}La_{0.05})_2(Fe_{0.8}Co_{0.2})_{14}B$ | 740 |
| Example 10 | $(Nd_{0.77}Pr_{0.18}La_{0.05})_2(Fe_{0.8}Co_{0.2})_{14}B$ | 740 |
| Example 11 | $(Nd_{0.77}Pr_{0.18}La_{0.05})_2(Fe_{0.8}Co_{0.2})_{14}B$ | 740 |
| Reference Example 2 | $(Nd_{0.77}Pr_{0.18}La_{0.05})_2(Fe_{0.8}Co_{0.2})_{14}B$ | 740 |

TABLE 5

| | Modifier | | | | | Magnetic Properties After Modification | |
|---|---|---|---|---|---|---|---|
| | Composition (molar ratio) | Substitution Ratio of Ce | Penetration Amount (parts by mol) | Penetration Temperature (° C.) | Penetration Time (min) | Coercive Force (kA/m) | Residual Magneti-zation (T) |
| Comparative Example 2 | $Tb_{0.7}Cu_{0.3}$ | 0 | 2.5 | 950 | 15 | 1465 | 1.27 |
| Example 6 | $(Tb_{0.9}Ce_{0.1})_{0.7}Cu_{0.3}$ | 0.1 | 2.5 | 950 | 15 | 1486 | 1.28 |
| Example 7 | $(Tb_{0.7}Ce_{0.3})_{0.7}Cu_{0.3}$ | 0.3 | 2.5 | 950 | 15 | 1396 | 1.28 |
| Example 8 | $(Tb_{0.6}Ce_{0.4})_{0.7}Cu_{0.3}$ | 0.4 | 2.5 | 950 | 15 | 1428 | 1.29 |
| Example 9 | $(Tb_{0.5}Ce_{0.5})_{0.7}Cu_{0.3}$ | 0.5 | 2.5 | 950 | 15 | 1311 | 1.30 |
| Example 10 | $(Tb_{0.4}Ce_{0.6})_{0.7}Cu_{0.3}$ | 0.6 | 2.5 | 950 | 15 | 1196 | 1.34 |
| Example 11 | $(Tb_{0.3}Ce_{0.7})_{0.7}Cu_{0.3}$ | 0.7 | 2.5 | 950 | 15 | 1138 | 1.33 |
| Reference Example 2 | $Ce_{0.7}Cu_{0.3}$ | 1 | 2.5 | 950 | 15 | 740 | — |

TABLE 6

| | Microstructure After Modification | | |
|---|---|---|---|
| | $Tb_{4g}/(Tb_{4g} + Tb_{4f})$ | $(Ce_{4g} + Ce_{4f})/(Tb_{4g} + Tb_{4f})$ | Composition of Shell Part |
| Comparative Example 2 | 0.47 | 0.00 | $(Nd_{0.49}Pr_{0.12}La_{0.03}Tb_{0.36}Ce_{0})_2(Fe_{0.8}Co_{0.2})_{14}B$ |
| Example 6 | 0.50 | 0.04 | $(Nd_{0.50}Pr_{0.12}La_{0.03}Tb_{0.34}Ce_{0.01})_2(Fe_{0.8}Co_{0.2})_{14}B$ |
| Example 7 | 0.56 | 0.11 | $(Nd_{0.50}Pr_{0.12}La_{0.03}Tb_{0.32}Ce_{0.03})_2(Fe_{0.8}Co_{0.2})_{14}B$ |
| Example 8 | 0.60 | 0.25 | $(Nd_{0.54}Pr_{0.13}La_{0.03}Tb_{0.24}Ce_{0.06})_2(Fe_{0.8}Co_{0.2})_{14}B$ |
| Example 9 | 0.62 | 0.25 | $(Nd_{0.56}Pr_{0.13}La_{0.04}Tb_{0.22}Ce_{0.05})_2(Fe_{0.8}Co_{0.2})_{14}B$ |
| Example 10 | 0.66 | 0.43 | $(Nd_{0.56}Pr_{0.13}La_{0.04}Tb_{0.19}Ce_{0.08})_2(Fe_{0.8}Co_{0.2})_{14}B$ |
| Example 11 | 0.66 | 0.84 | $(Nd_{0.58}Pr_{0.14}La_{0.04}Tb_{0.13}Ce_{0.11})_2(Fe_{0.8}Co_{0.2})_{14}B$ |
| Reference Example 2 | — | — | — |

TABLE 7

| | Rare Earth Magnet Precursor | |
|---|---|---|
| | Composition of Core Part (molar ratio) | Coercive Force (kA/m) |
| Comparative Example 3 | $(Nd_{0.5}Ce_{0.375}La_{0.125})_2Fe_{14}B$ | 94 |
| Example 12 | $(Nd_{0.5}Ce_{0.375}La_{0.125})_2Fe_{14}B$ | 94 |
| Example 13 | $(Nd_{0.5}Ce_{0.375}La_{0.125})_2Fe_{14}B$ | 94 |
| Example 14 | $(Nd_{0.5}Ce_{0.375}La_{0.125})_2Fe_{14}B$ | 94 |
| Example 15 | $(Nd_{0.5}Ce_{0.375}La_{0.125})_2Fe_{14}B$ | 94 |
| Example 16 | $(Nd_{0.5}Ce_{0.375}La_{0.125})_2Fe_{14}B$ | 94 |
| Example 17 | $(Nd_{0.5}Ce_{0.375}La_{0.125})_2Fe_{14}B$ | 94 |
| Example 18 | $(Nd_{0.5}Ce_{0.375}La_{0.125})_2Fe_{14}B$ | 94 |
| Reference Example 3 | $(Nd_{0.5}Ce_{0.375}La_{0.125})_2Fe_{14}B$ | 94 |

TABLE 8

| | Auxiliary Modifier | | | | After Preliminary Modification |
|---|---|---|---|---|---|
| | Composition (molar ratio) | Penetration Amount (parts by mol) | Penetration Temperature (° C.) | Penetration Time (min) | Coercive Force (kA/m) |
| Comparative Example 3 | $Nd_{0.9}Cu_{0.1}$ | 4.7 | 950 | 165 | 627 |
| Example 12 | $Nd_{0.9}Cu_{0.1}$ | 4.7 | 950 | 165 | 627 |
| Example 13 | $Nd_{0.9}Cu_{0.1}$ | 4.7 | 950 | 165 | 627 |
| Example 14 | $Nd_{0.9}Cu_{0.1}$ | 4.7 | 950 | 165 | 627 |
| Example 15 | $Nd_{0.9}Cu_{0.1}$ | 4.7 | 950 | 165 | 627 |
| Example 16 | $Nd_{0.9}Cu_{0.1}$ | 4.7 | 950 | 165 | 627 |
| Example 17 | $Nd_{0.9}Cu_{0.1}$ | 4.7 | 950 | 165 | 627 |
| Example 18 | $Nd_{0.9}Cu_{0.1}$ | 4.7 | 950 | 165 | 627 |
| Reference Example 3 | $Nd_{0.9}Cu_{0.1}$ | 4.7 | 950 | 165 | 627 |

TABLE 9

| | Modifier | | | | | Magnetic Properties After Modification | |
|---|---|---|---|---|---|---|---|
| | | | Penetration | | | | |
| | Composition (molar ratio) | Substitution Ratio of Ce | Amount (parts by mol) | Penetration Temperature (° C.) | Penetration Time (min) | Coercive Force (kA/m) | Residual Magnetization (T) |
| Comparative Example 3 | $Tb_{0.7}Cu_{0.3}$ | 0 | 2.5 | 900 | 15 | 753 | 1.22 |
| Example 12 | $(Tb_{0.9}Ce_{0.1})_{0.7}Cu_{0.3}$ | 0.1 | 2.5 | 900 | 15 | 804 | 1.22 |
| Example 13 | $(Tb_{0.8}Ce_{0.2})_{0.7}Cu_{0.3}$ | 0.2 | 2.5 | 900 | 15 | 807 | 1.22 |
| Example 14 | $(Tb_{0.7}Ce_{0.3})_{0.7}Cu_{0.3}$ | 0.3 | 2.5 | 900 | 15 | 942 | 1.20 |
| Example 15 | $(Tb_{0.6}Ce_{0.4})_{0.7}Cu_{0.3}$ | 0.4 | 2.5 | 900 | 15 | 895 | 1.20 |
| Example 16 | $(Tb_{0.5}Ce_{0.5})_{0.7}Cu_{0.3}$ | 0.5 | 2.5 | 900 | 15 | 942 | 1.21 |
| Example 17 | $(Tb_{0.4}Ce_{0.6})_{0.7}Cu_{0.3}$ | 0.6 | 2.5 | 900 | 15 | 812 | 1.24 |
| Example 18 | $(Tb_{0.3}Ce_{0.7})_{0.7}Cu_{0.3}$ | 0.7 | 2.5 | 900 | 15 | 688 | 1.21 |
| Reference Example 3 | $Ce_{0.7}Cu_{0.3}$ | 1 | 2.5 | 900 | 15 | 627 | — |

TABLE 10

| | Microstructure After Modification | | |
|---|---|---|---|
| | $Tb_{4g}/(Tb_{4g} + Tb_{4f})$ | $(Ce_{4g} + Ce_{4f})/(Tb_{4g} + Tb_{4f})$ | Composition of Shell Part |
| Comparative Example 3 | 0.43 | 0.58 | $(Nd_{0.52}Ce_{0.13}La_{0.13}Tb_{0.22})_2Fe_{14}B$ |
| Example 12 | 0.44 | 0.61 | $(Nd_{0.5}Ce_{0.14}La_{0.13}Tb_{0.23})_2Fe_{14}B$ |
| Example 13 | 0.45 | 0.52 | $(Nd_{0.35}Ce_{0.19}La_{0.09}Tb_{0.37})_2Fe_{14}B$ |
| Example 14 | 0.47 | 0.55 | $(Nd_{0.35}Ce_{0.20}La_{0.09}Tb_{0.36})_2Fe_{14}B$ |
| Example 15 | 0.48 | 1.14 | $(Nd_{0.45}Ce_{0.23}La_{0.12}Tb_{0.20})_2Fe_{14}B$ |
| Example 16 | 0.49 | 1.66 | $(Nd_{0.48}Ce_{0.25}La_{0.12}Tb_{0.15})_2Fe_{14}B$ |
| Example 17 | 0.51 | 1.47 | $(Nd_{0.48}Ce_{0.24}La_{0.12}Tb_{0.16})_2Fe_{14}B$ |
| Example 18 | 0.52 | 2.03 | $(Nd_{0.45}Ce_{0.29}La_{0.11}Tb_{0.15})_2Fe_{14}B$ |
| Reference Example 3 | — | — | — |

In FIGS. 7 to 9, the dashed line is a line formed by connecting the coercive force value of the sample having experienced diffusion and penetration of a modifier ($Tb_{0.7}Cu_{0.3}$) in which the molar ratio of Ce is 0, and the coercive force value of the sample having experienced diffusion and penetration of a modifier ($Ce_{0.7}Cu_{0.3}$) in which the molar ratio of Ce is 1. Conventionally, it has been considered that as the molar ratio of Ce in the modifier is higher, the coercive force decreases. Therefore, the coercive force has been conventionally considered to decrease along the dashed line. However, the samples of Examples having experienced diffusion and penetration of a modifier ($(Tb_{(1-x)}Ce_x)_{0.7}Cu_{0.3}$, wherein $0 \leq x < 1$) in which Tb ($R^2$) and Ce are present together have a coercive force value at positions above the dashed line. From this, it can be understood that the rare earth magnet of the present disclosure has higher coercive force than that estimated from the content ratio of the heavy rare earth element ($R^2$) in the rare earth element. Also, from Tables 1 to 3, it can be understood that the rare earth magnet of the present disclosure having such coercive force satisfies $0.44 \leq R^2_{4g}/(R^2_{4f}+R^2_{4g}) \leq 0.70$ and $0.04 \leq (Ce_{4f}+Ce_{4g})/(R^2_{4f}+R^2_{4g})$.

In addition, from Table 1 and FIG. 10, it can be understood that the rare earth magnet according to the first embodiment has particularly high coercive force when $0.47 \le R^2_{4g}/(R^2_{4f}+R^2_{4g}) \le 0.54$ is satisfied. Also, from Table 2 and FIG. 11, it can be understood that the rare earth magnet according to the second embodiment has particularly high coercive force when $0.50 \le R^2_{4g}/(R^2_{4f}+R^2_{4g}) \le 0.60$ is satisfied. Furthermore, from Table 3 and FIG. 12, it can be understood that the rare earth magnet according to the third embodiment has particularly high coercive force when $0.44 \le R^2_{4g}/(R^2_{4f}+R^2_{4g}) \le 0.51$ is satisfied.

From these results, the effects of the rare earth magnet of the present disclosure and the producing method thereof could be confirmed.

REFERENCE SIGNS LIST

10 Main phase
12 Core part
14 Shell part
16 Secondary shell part
20 Grain boundary phase
50 Rare earth magnet precursor
60 Modifier
62 Auxiliary modifier
100 Rare earth magnet of the present disclosure

The invention claimed is:

1. A rare earth magnet, comprising:

a main phase having a composition represented by, in molar ratio, $R^1_2T_{14}B$, where $R^1$ is one or more elements selected from the group consisting of Y and rare earth elements and T is one or more transition elements mandatorily containing one or more elements selected from the group consisting of Fe, Co and Ni, and a grain boundary phase present around the main phase, wherein:

the main phase has a core part and a shell part present around the core part, the molar ratio of $R^2$, where $R^2$ one or more elements selected from the groups consisting of Gd, Tb, Dy, Ho, Er, Tm, Yb, and Lu, in the shell part is higher than the molar ratio of $R^2$ in the core part, the rare earth magnet satisfies the following relationships, denoting the abundances of $R^2$ and Ce occupying 4f site of the shell part as $R^2_{4f}$ and $Ce_{4f}$, respectively, and denoting the abundances of $R^2$ and Ce occupying 4g site of the shell part as $R^2_{4g}$ and $Ce_{4g}$, respectively:

$$0.44 \le R^2_{4g}/(R^2_{4f}+R^2_{4g}) \le 0.70, \text{ and}$$

$$0.04 \le (Ce_{4f}+Ce_{4g})/(R^2_{4f}+R^2_{4g}), \text{ and}$$

the rare earth magnet further has a secondary shell part between the core part and the shell part, wherein the molar ratio of $R^4$, where $R^4$ is one or more elements selected from the group consisting of Pr, Nd, Pm, Sm and Eu, in the secondary shell part is higher than the molar ratio of $R^4$ in the core part.

2. The rare earth magnet according to claim 1, wherein:

$R^1$ is one or more Y and rare earth elements mandatorily containing Ce, Nd and $R^2$, T is one or more transition elements mandatorily containing one or more elements selected from the group consisting of Fe and Co, in the core part, the molar ratio of the total of Y, Sc, La and Ce is less than 0.10 relative to $R^1$ in the entire core part, in the core part, the molar ratio of Co is less than 0.10 relative to T in the entire core part, and the rare earth magnet satisfies the following relationship:

$$0.47 \le R^2_{4g}/(R^2_{4f}+R^2_{4g}) \le 0.54.$$

3. The rare earth magnet according to claim 1, wherein:

$R^1$ is one or more Y and rare earth elements mandatorily containing Ce, La, Nd and $R^2$, T is one or more transition elements mandatorily containing one or more elements selected from the group consisting of Fe and Co, in the core part, the molar ratio of the total of Y, Sc and Ce is less than 0.10 and the molar ratio of La is from 0.01 to 0.20, relative to $R^1$ in the entire core part, in the core part, the molar ratio of Co is from 0.10 to 0.40 relative to T in the entire core part, and the rare earth magnet satisfies the following relationship:

$$0.50 \le R^2_{4g}/(R^2_{4f}+R^2_{4g}) \le 0.60.$$

4. The rare earth magnet according to claim 1, wherein:

$R^1$ is one or more Y and rare earth elements mandatorily containing Ce, Nd and $R^2$, T is one or more transition elements mandatorily containing one or more elements selected from the group consisting of Fe and Co, in the core part, the molar ratio of the total of Y, Sc, La and Ce is from 0.10 to 0.90 relative to $R^1$ in the entire core part, in the core part, the molar ratio of Co is 0.40 or less relative to T in the entire core part, and the rare earth magnet satisfies the following relationship:

$$0.44 \le R^2_{4g}/(R^2_{4f}+R^2_{4g}) \le 0.51.$$

5. A method for producing the rare earth magnet according to claim 1, the rare earth magnet-producing method comprising:

preparing a rare earth magnet precursor including a main phase having a composition represented by, in molar ratio, $R^1_2T_{14}B$ ($R^1$ is one or more elements selected from the group consisting of Y and rare earth elements and T is one or more transition elements mandatorily containing one or more elements selected from the group consisting of Fe, Co and Ni) and a grain boundary phase present around the main phase, allowing a modifier containing at least $R^2$ and Ce to diffuse and penetrate inside the rare earth magnet precursor, and before the modifier diffuses and penetrates inside the rare earth magnet precursor, allowing an auxiliary modifier to diffuse and penetrate inside the rare earth magnet precursor, wherein:

the auxiliary modifier contains at least $R^4$, where $R^4$ is one or more elements selected from the group consisting of Pr, Nd, Pm, Sm and Eu.

6. The rare earth magnet-producing method according to claim 5, wherein:

in the rare earth magnet precursor, $R^1$ is one or more Y and rare earth elements mandatorily containing Nd, T is one or more transition elements mandatorily containing one or more elements selected from the group consisting of Fe and Co, the molar ratio of the total of Y, Sc, La and Ce is less than 0.10 relative to $R^1$, and the molar ratio of Co is less than 0.10 relative to T.

7. The rare earth magnet-producing method according to claim 5, wherein:

in the rare earth magnet precursor, $R^1$ is one or more Y and rare earth elements mandatorily containing La and Nd, T is one or more transition elements mandatorily containing one or more elements selected from the group consisting of Fe and Co, the molar ratio of the total of Y, Sc and Ce is less than 0.10 and the molar ratio of La is from 0.01 to 0.20, relative to $R^1$, and the molar ratio of Co is from 0.10 to 0.40 relative to T.

8. The rare earth magnet-producing method according to claim 5, wherein:

in the rare earth magnet precursor, $R^1$ is one or more Y and rare earth elements mandatorily containing Ce and Nd, T is one or more transition elements mandatorily containing one or more elements selected from the group consisting of Fe and Co, the molar ratio of the total of Y, Sc, La and Ce is from 0.10 to 0.90 relative to $R^1$, and the molar ratio of Co is 0.40 or less relative to T.

* * * * *